(12) United States Patent
Chan et al.

(10) Patent No.: US 9,169,394 B2
(45) Date of Patent: Oct. 27, 2015

(54) METHODS FOR DISPERSING CARBON NANOTUBES AND COMPOSITIONS USED FOR THE METHODS

(75) Inventors: Bee Eng Mary Chan, Singapore (SG); Wei Yuan, Singapore (SG); Junluo Feng, Singapore (SG); Zaher Judeh, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 276 days.

(21) Appl. No.: 13/577,870

(22) PCT Filed: Feb. 9, 2011

(86) PCT No.: PCT/SG2011/000057
§ 371 (c)(1),
(2), (4) Date: Oct. 23, 2012

(87) PCT Pub. No.: WO2011/099939
PCT Pub. Date: Aug. 18, 2011

(65) Prior Publication Data
US 2013/0035419 A1    Feb. 7, 2013

Related U.S. Application Data

(60) Provisional application No. 61/302,808, filed on Feb. 9, 2010.

(51) Int. Cl.
| | | |
|---|---|---|
| *C08K 3/04* | (2006.01) | |
| *C08K 7/00* | (2006.01) | |
| *C08K 9/04* | (2006.01) | |
| *C08L 79/08* | (2006.01) | |
| *B82Y 30/00* | (2011.01) | |
| *C08G 73/06* | (2006.01) | |
| *C08G 73/10* | (2006.01) | |
| *C08G 73/18* | (2006.01) | |
| *C08J 3/205* | (2006.01) | |
| *C08L 63/00* | (2006.01) | |
| *C08L 65/00* | (2006.01) | |
| *C08L 79/04* | (2006.01) | |
| *H01B 1/24* | (2006.01) | |
| *C08K 7/24* | (2006.01) | |
| *C08L 87/00* | (2006.01) | |

(52) U.S. Cl.
CPC ............... *C08L 79/08* (2013.01); *B82Y 30/00* (2013.01); *C08G 73/0655* (2013.01); *C08G 73/10* (2013.01); *C08G 73/18* (2013.01); *C08J 3/2053* (2013.01); *C08L 63/00* (2013.01); *C08L 65/00* (2013.01); *C08L 79/04* (2013.01); *C08L 79/085* (2013.01); *H01B 1/24* (2013.01); *C08G 2261/3422* (2013.01); *C08K 3/04* (2013.01); *C08K 7/24* (2013.01); *C08L 87/005* (2013.01)

(58) Field of Classification Search
None
See application file for complete search history.

(56) References Cited

U.S. PATENT DOCUMENTS

| | | |
|---|---|---|
| 2006/0270777 A1 | 11/2006 | Wise et al. |
| 2007/0078215 A1 | 4/2007 | Yoon et al. |
| 2009/0118420 A1 | 5/2009 | Zou et al. |
| 2013/0102719 A1* | 4/2013 | John et al. ............ 524/356 |
| 2014/0174991 A1* | 6/2014 | Khripin et al. ............ 209/3.1 |

FOREIGN PATENT DOCUMENTS

| | | |
|---|---|---|
| WO | 2008/036123 A2 | 3/2008 |
| WO | 2008/046010 A2 | 4/2008 |
| WO | 2008/139839 A1 | 11/2008 |

OTHER PUBLICATIONS

An et al., "Rod-like attapulgite/polyimide nanocomposites with simultaneously improved strength, toughness, thermal stability and related mechanisms," *Journal of Materials Chemistry* 18(41):4928-4941, 2008.
Baskaran et al., "Noncovalent and Nonspecific Molecular Interactions of Polymers with Multiwalled Carbon Nanotubes," *Chemistry of Materials* 17(13):3389-3397, 2005.
Becker et al., "Layered Silicate Nanocomposites Based on Various High-Functionality Epoxy Resins: The Influence of Cure Temperature on Morphology, Mechanical Properties, and Free Volume," *Macromolecules* 36(5):1616-1625, 2003.
Blond et al., "Enhancement of Modulus, Strength, and Toughness in Poly(methyl methacrylate)-Based Composites by the Incorporation of Poly(methyl methacrylate)-Functionalized Nanotubes," *Advanced Functional Materials* 16(12):1608-1614, 2006.
Che et al., "Epoxy Composite Fibers Reinforced with Aligned Single-Walled Carbon Nanotubes Functionalized with Generation 0—2 Dendritic Poly(amidoamine)," *Chemistry of Materials* 21(8):1471-1479, 2009.
Che et al., "Reactive Spinning of Cyanate Ester Fibers Reinforced with Aligned Amino-Functionalized Single Wall Carbon Nanotubes," *Advanced Functional Materials* 18(6):888-897, 2008.
Chen et al., "A Versatile, Molecular Engineering Approach to Simultaneously Enhanced, Multifunctional Carbon Nanotube—Polymer Composites," *Advanced Functional Materials* 16(1):114-119, 2006.
Chen et al., "Two-Step Syntheis of Side-Chain Aromatic Polyimides for Second-Order Nonlinear Optics," *Macromolecules* 29(2):535-539, 1996.
Cheng et al., "High Mechanical Performance Composite Conductor: Multi-Walled Carbon Nanotube Sheet/Bismaleimide Nanocomposites," *Advanced Functional Materials* 19:3219-3225, 2009.
Coleman et al., "Mechanical Reinforcement of Polymers Using Carbon Nanotubes," *Advanced Materials* 18(6):689-706, 2006.

(Continued)

*Primary Examiner* — Michael J Feely
(74) *Attorney, Agent, or Firm* — Seed IP Law Group PLLC

(57) ABSTRACT

The present invention refers to a method of dispersing carbon nanotubes in a thermosetting resin. The method comprises: (a) contacting the carbon nanotubes with a dispersant in a solvent to form a dispersion mixture, wherein the dispersant is a graft polymer comprising a polymeric backbone and a side chain grafted to the polymeric backbone; and (b) adding the thermosetting resin to the dispersion solution to form a resin blend. The present invention also refers to a composition used for the method.

19 Claims, 20 Drawing Sheets

(56) References Cited

OTHER PUBLICATIONS

Delozier et al., "Investigation of Aromatic/Aliphatic Polyimides as Dispersants for Single Wall Carbon Nanotubes," *Macromolecules* 39(5):1731-1739, 2006.

Fang et al., "Structure and Properties of Multiwalled Carbon Nanotubes/Cyanate Ester Composites," *Polymer Engineering and Science* 46(5):670-679, 2006.

Gao et al., "Continuous Spinning of a Single-Walled Carbon Nanotube—Nylon Composite Fiber," *Journal of the American Chemical Society* 127(11):3847-3854, 2005.

Grigat et al., "New Methods of Preparative Organic Chemistry VI: Synthesis and Reactions of Cyanic Esters," *Angewandte Chemie-international Edition* 6(3):206-218, 1967.

Itkis et al., "Comparison of Analytical Techniques for Purity Evaluation of Single-Walled Carbon Nanotubes," *Journal of the American Chemical Society* 127(10):3439-3448, 2005.

Kim et al., "A strategy for enhancement of mechanical and electrical properties of polycarbonate/multi-walled carbon nanotube composites," *Carbon* 47(4):1126-1134, 2009.

Kim et al., "Design of Dispersants for the Dispersion of Carbon Nanotubes in an Organic Solvent," *Advanced Functional Materials* 17(11):1775-1783, 2007.

Kim et al., "Synthesis of Polythiophene-*graft*-PMMA and Its Role as Compatibilizer for Poly(styrene-*co*-acrylonitrile)/MWCNT Nanocomposites," *Macromolecules* 40(10):3708-3713, 2007.

Kumar et al., "Synthesis, Structure, and Properties of PBO/SWNT Composites," *Macromolecules* 35(24):9039-9043, 2002.

Laskoski et al., "Oligomeric Cyanate Ester Resins: Application of a Modified Ullmann Synthesis in the Preparation of Thermosetting Polymers," *Journal of Polymer Science: Part A: Polymer Chemistry* 44(15):4559-4565, 2006.

Liang et al., "Cyanate Ester/Polyhedral Oligomeric Silsesquioxane (POSS) Nanocomposites: Synthesis and Characterization," *Chemistry of Materials* 18(2):301-312, 2006.

Liang et al., "Enhancement of Processability of Cyanate Ester Resin via Copolymerization with Epoxy Resin," *Journal of Applied Polymer Science* 85(11):2377-2381, 2002.

Lin, "In Situ FTIR and DSC Investigation on Cure Reaction of Liquid Aromatic Dicyanate Ester with Different Types of Epoxy Resin," *Journal of Polymer Science: Part A: Polymer Chemistry* 38(16):2934-2944, 2000.

Lin, "Synthesis of novel phosphorous-containing cyanate esters and their curing reaction with epoxy resin," *Polymer* 45(23):7911-7926, 2004.

Liu et al., "Controlled deposition of individual single-walled carbon nanotubes on chemically functionalized templates," *Chemical Physics Letters* 303(1-2):125-129, Apr. 2, 1999.

Liu et al., "Morphology and Mechanical Properties of Multiwalled Carbon Nanotubes—Reinforced Nylon-6 Composites," *Macromolecule* 37(19):7214-7222, 2004.

Liu et al., "Tensile Mechanics of Electrospun Multiwalled Nanotube/Poly(methyl methacrylate) Nanofibers," *Advanced Materials* 19(9):1228-1233, 2007.

Ma et al., "High-Strength Composite Fibers: Realizing True Potential of Carbon Nanotubes in Polymer Matrix through Continuous Reticulate Architecture and Molecular Level Couplings," *Nano Letters* 9(8):2855-2861, 2009.

McIntosh et al., "Nanocomposite Fiber Systems Processed from Fluorinated Single-Walled Carbon Nanotubes and a Polypropylene Matrix," *Chemistry of Materials* 18(19):4561-4569, 2006.

Moniruzzaman et al., "Polymer Nanocomposites Containing Carbon Nanotubes," *Macromolecules* 39(16):5194-5205, 2006.

Niyogi et al., "Ultrasonic Dispersions of Single-Walled Carbon Nanotubes," *Journal of Physical Chemistry B* 107(34):8799-8804, 2003.

O'Connell et al., "Band Gap Fluorescence from Individual Single-Walled Carbon Nanotubes," *Science* 297(5581):593-596, Jul. 26, 2002.

Okamoto et al., "Individual Dissolution of Single-Walled Carbon Nanotubes by Using Polybenzimidazole, a Highly Effective Reinforcement of Their Composite Films," *Advanced Functional Materials* 18(12):1776-1782, 2008.

Pan et al., "Hybrid Network Structure and Mechanical Properties of Rodlike Silicate/Cyanate Ester Nanocomposites," *Macromolecules* 41(23):9245-9258, 2008.

Putz et al., "Effect of Cross-Link Density on Interphase Creation in Polymer Nanocomposites," *Macromolecules* 41(18):6752-6756, 2008.

Rao et al., "Evidence for charge transfer in doped carbon nanotube bundles from Raman scattering," *Nature* 388(6639):257-259, Jul. 17, 1997.

Salalha et al., "Single-Walled Carbon Nanotubes Embedded in Oriented Polymeric Nanofibers by Electrospinning," *Langmuir* 20(22):9852-9855, 2004.

Sekhar et al., "Cure Behavior of Epoxy-Cyanate Ester Blend in Composite Systems: Evaluation Studies in Neat Resin Cast by Thermal FTIR Techniques," *Journal of Applied Polymer Science* 109(3):2023-2028, 2008.

Shigeta et al., "Individual solubilization of single-walled carbon nanotubes using totally aromatic polyimide," *Chemical Physics Letters* 418(1-3):115-118, 2006.

Shim et al., "Multiparameter Structural Optimization of Single-Walled Carbon Nanotube Composites: Toward Record Strength, Stiffness, and Toughness," *ACS Nano* 3(7):1711-1722, 2009.

Sun et al., "Mechanical properties of surface-fiinctionalized SWCNT/epoxy composites," *Carbon* 46(2):320-328, 2008.

Tournus et al., "π-stacking interaction between carbon nanotubes and organic molecules," *Physical Review B* 72(7):075431, 2005, 5 pages.

Tseng et al., "Functionalizing Carbon Nanotubes by Plasma Modification for the Preparation of Covalent-Integrated Epoxy Composites," *Chemistry of Materials* 19(2):308-315, 2007.

van Dijk-Wolthuis et al., "Synthesis, Characterization, and Polymerization of Glycidyl Methacrylate Derivatized Dextran," *Macromolecules* 28(18):6317-6322, 1995.

Wang et al., "Synthesis and Properties of Polyimides Containing Multiple Alkyl Side Chains," *Macromolecules* 40(4):889-900, 2007.

Wood et al., "Mechanical Response of Carbon Nanotubes under Molecular and Macroscopic Pressures," *The Journal of Physical Chemistry B* 103(47):10388-10392, 1999.

Yan et al., "Individually Dispersing Single-Walled Carbon Nanotubes with Novel Neutral pH Water-Soluble Chitosan Derivatives," *Journal of Physical Chemistry C* 112(20):7579-7587, 2008.

Yang et al., "Interactions between Polymers and Carbon Nanotubes: A Molecular Dynamics Study," *The Journal of Physical Chemistry B* 109(20):10009-10014, 2005.

Yeniad et al., "Synthesis and Photopolymerizations of New Phosphonated Monomers for Dental Applications," *Journal of Polymer Science Part A: Polymer Chemistry* 46(6):2290-2299, 2008.

Yuan et al., "Use of Polyimide-*graft*-Bisphenol A Diglyceryl Acrylate as a Reactive Noncovalent Dispersant of Single-Walled Carbon Nanotubes for Reinforcement of Cyanate Ester/Epoxy Composite," *Chemistry of Materials* 22(24):6542-6554, 2010.

Zhang et al., "Polyimide-Surface-Modified Silica Tubes: Preparation and Cryogenic Properties," *Chemistry of Materials* 19(8):1939-1945, 2007.

Zhang et al., "Poly(vinyl alcohol)/SWNT Composite Film," *Nano Letters* 3(9):1285-1288, 2003.

Zhou et al., "In situ preparation and continuous fiber spinning of poly(*p*-phenylene benzobisoxazole) composites with oligo-hydroxyamide-functionalized multi-walled carbon nanotubes," *Polymer* 49(10):2520-2530, 2008.

Zhu et al., "Improving the Dispersion and Integration of Single-Walled Carbon Nanotubes in Epoxy Composites through Functionalization," *Nano Letters* 3(8):1107-1113, 2003.

Zhu et al., "Reinforcing Epoxy Polymer Composites Through Covalent Integration of Functionalized Nanotubes," *Advanced Functional Materials* 14(7):643-648, Jul. 2004.

Zou et al., "Dispersion of Pristine Carbon Nanotubes Using Conjugated Block Copolymers," *Advanced Materials* 20(11):2055-2060, 2008.

\* cited by examiner

FIG. 5
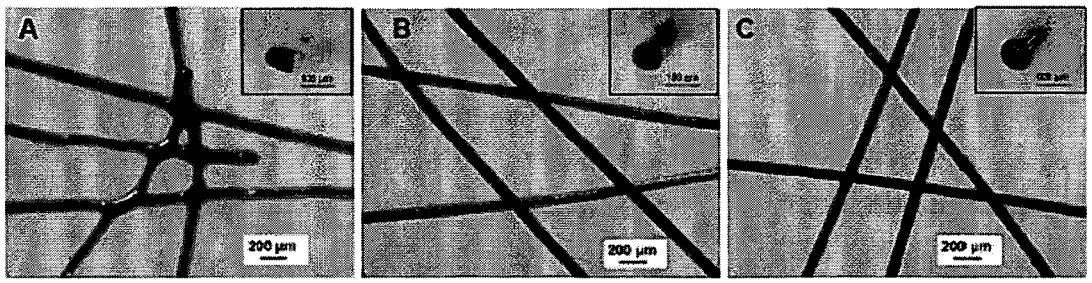
FIG. 6
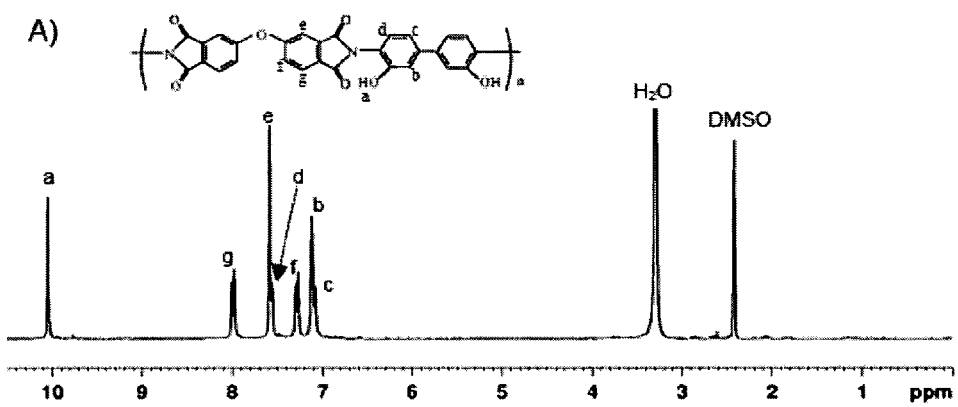
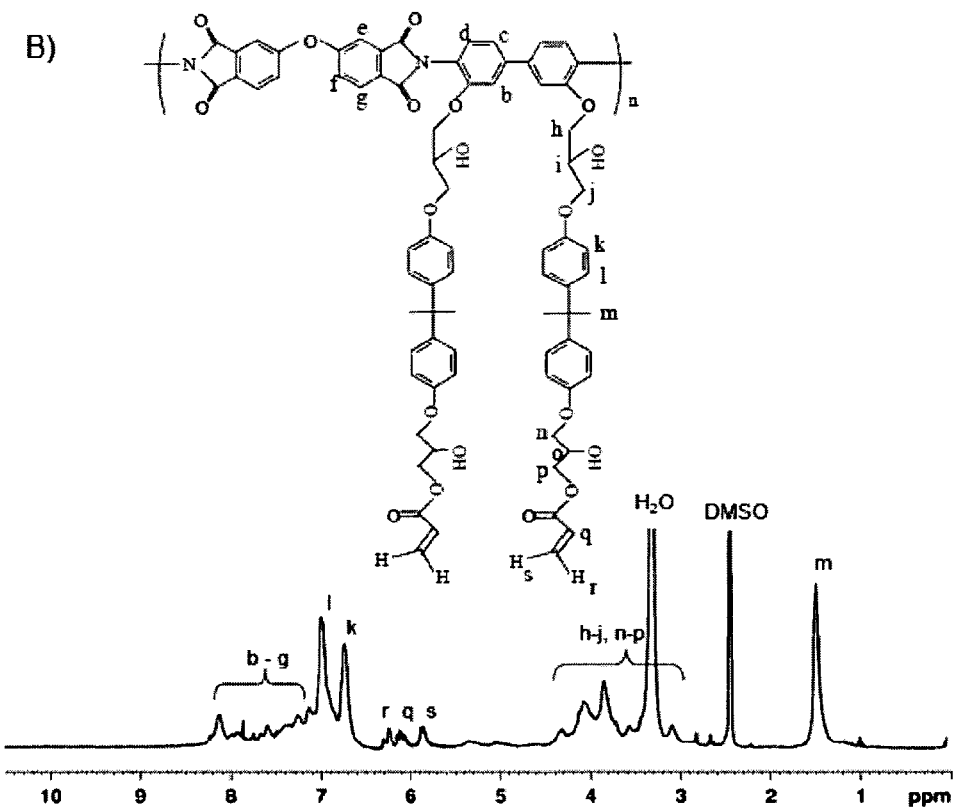

FIG. 16
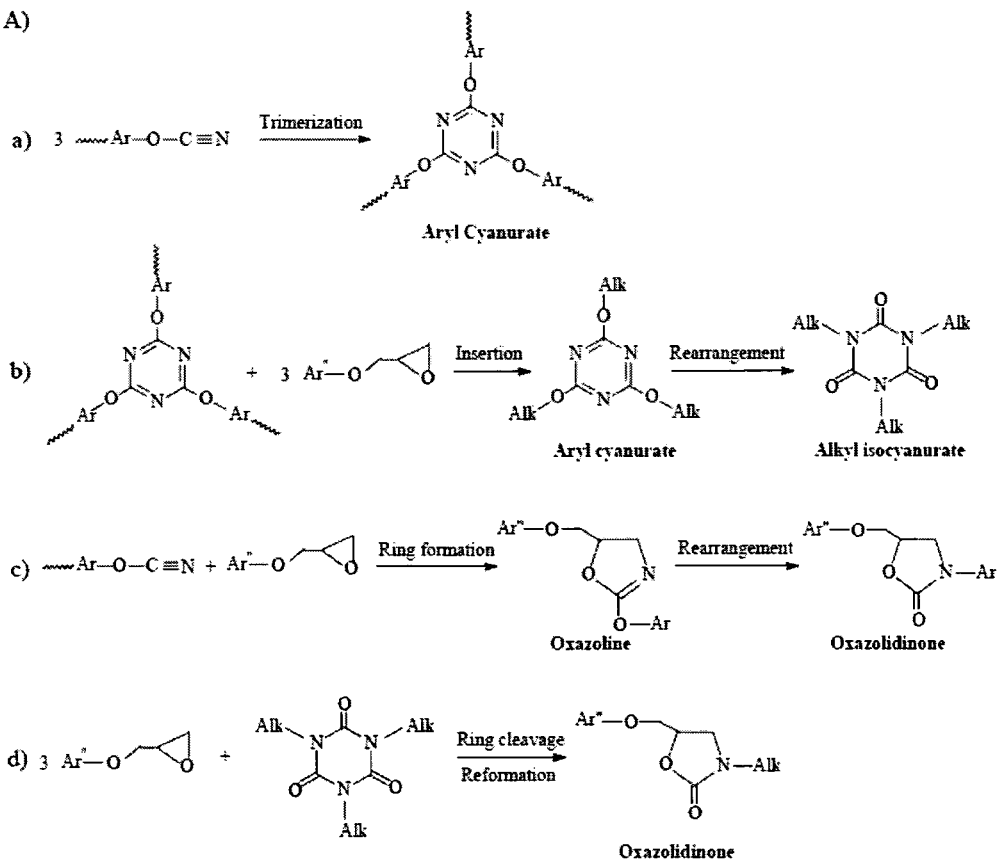
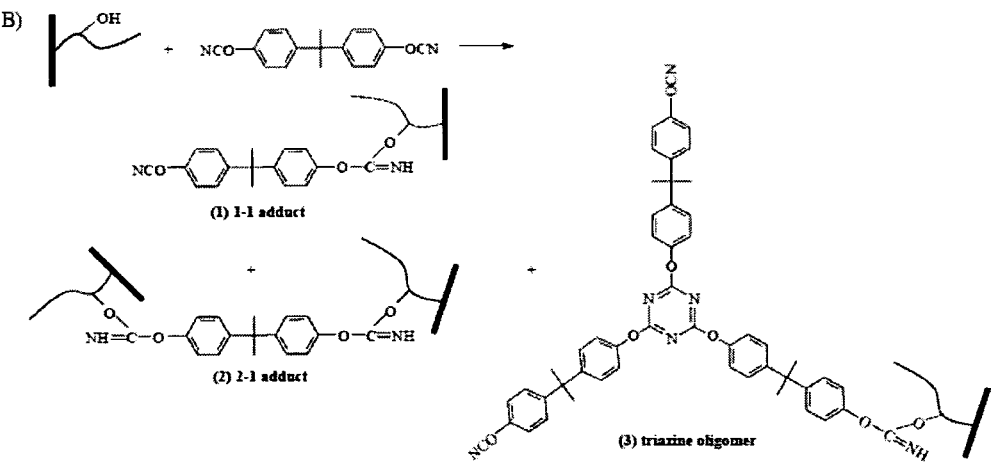

FIG. 17

| sample | E (GPa) | σ (MPa) | ε (%) | T$^a$ (MJ m$^{-3}$) | T$_g^b$ (°C) | T$_d^c$ (°C) |
|---|---|---|---|---|---|---|
| neat CE-EP | 2.61 ± 0.14 | 83.7 ± 3.3 | 5.0 ± 0.4 | 2.6 ± 0.2 | 167 | 305 |
| SWNTs (0.2 wt %)/R | 3.37 ± 0.07 | 103.1 ± 8.5 | 4.7 ± 0.7 | 3.0 ± 0.4 | 167 | 307 |
| SWNTs(0.5 wt %)/R | 3.38 ± 0.10 | 107.0 ± 11.0 | 4.7 ± 0.6 | 2.9 ± 0.2 | 165 | 311 |
| SWNTs(1 wt %)/R | 3.47 ± 0.18 | 100.1 ± 6.5 | 3.9 ± 0.4 | 2.5 ± 0.3 | 162 | 317 |
| SWNTs(1.5 wt %)/R | 3.10 ± 0.19 | 70.6 ± 4.6 | 2.5 ± 0.4 | 1.0 ± 0.2 | 159 | 318 |
| SWNTs(0.2 wt %)/PI-BDA/R | 3.48 ± 0.15 | 120.1 ± 2.7 | 6.2 ± 0.7 | 5.2 ± 0.6 | 175 | 308 |
| SWNTs(0.5 wt %)/PI-BDA/R | 3.87 ± 0.09 | 124.3 ± 2.2 | 4.8 ± 0.4 | 4.2 ± 0.3 | 170 | 317 |
| SWNTs(1 wt %)/PI-BDA/R | 4.70 ± 0.24 | 142.3 ± 6.9 | 4.2 ± 0.8 | 4.1 ± 0.4 | 164 | 323 |
| SWNTs(1.5 wt %)/PI-BDA/R | 4.40 ± 0.34 | 124.8 ± 9.6 | 3.7 ± 0.4 | 2.9 ± 0.3 | 160 | 320 |

$^a$Calculated from the area under the stress–strain curve. $^b$The glass transition temperature determined by differential scanning calorimetry. $^c$Thermal decomposition at 5 wt % weight loss.

FIG. 18

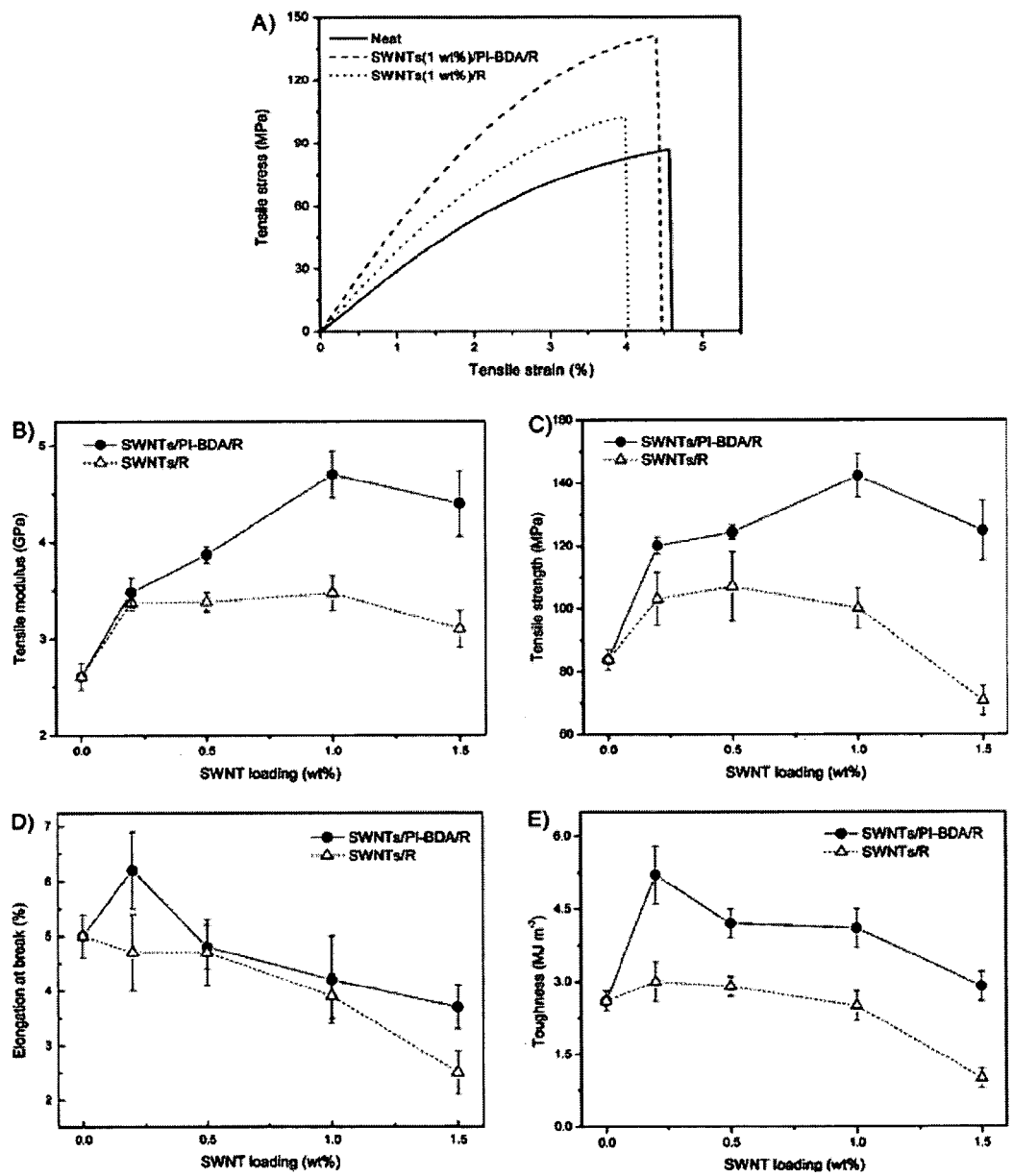

FIG. 20

| Ref. and year | CNT type | CNT treatment[a] | Processing Technique | CNT content (wt%) | Neat epoxy σ (Mpa) | Neat epoxy E (Gpa) | CNT/epoxy σ (Mpa)[b] | CNT/epoxy E (GPa)[b] | dσ/dW_NT (MPa) | dE/dW_NT (GPa) |
|---|---|---|---|---|---|---|---|---|---|---|
| 2003 [S12] | HiPco SWNTs | fluorination (cf) | solution mixing | 1 | 83.2 | 2.026 | 95.0 (14%) | 2.632 (30%) | 1180 | 61 |
| 2004 [S13] | HiPco SWNTs | amino-modified (cf) | solution mixing | 1 | 83 | 2.026 | 104 (25%) | 2.650 (31%) | 2100 | 62 |
| 2004 [S14] | DWNTs | amino-modified (cf) | calandering | 1 | 63.8 | 3.29 | 65.2 (2%) | 3.51 (7%) | 140 | 22 |
| 2005 [S15] | CVD DWNTs | amino-modified (cf) | calandering | 0.5 | 63.8 | 2.5999 | 69.13 (8%) | 2.978 (15%) | 1066 | 76 |
| 2005 [S16] | CVD MWNTs | no treatment (cf) | solution mixing | 1.5 | 68 | NA | 80 (18%) | NA | 800 | NA |
| 2006 [S17] | CVD MWNTs | plasma treatment (cf) | direct mixing | 1 | 26 | 1.21 | 58 (123%) | 1.61 (33%) | 3200 | 40 |
| 2006 [S18] | SWNTs | acid treatment (cf) | solution mixing | 0.1 | 64.8 | 2.875 | 68.4 (6%) | 2.910 (1%) | 3600 | 35 |
| 2007 [S19] | CVD MWNTs | maleic anhydride grafted (cf) | direct mixing | 1 | 45 | 0.62 | 67.5 (50%) | 1.25 (102%) | 2250 | 63 |
| 2008 [S20] | SWNTs | poly(amidoamine) modified (cf) | solution mixing | 1 | 64.1 | 2.76 | 74.7 (17%) | 3.49 (26%) | 1060 | 73 |
| 2009 [S21] | CVD SWNTs | poly(amidoamine) grafted (cf) | solution mixing | 0.5 | 90 | 3.3 | 125.1 (39%) | 3.89 (18%) | 7020 | 118 |
| 2009 [S22] | MWNTs | acid treatment (cf) | solution mixing | 0.5 | 73.4 | 2.67 | 74.4 (1%) | 3.09 (16%) | 200 | 84 |
| 2010 [S23] | CVD MWNTs | no treatment (cf) | direct mixing | 10 | 64.51 | 3.11 | 110.1 (71%) | 5.41 (74%) | 456 | 23 |
| our results | CVD SWNTs | Non-covalent functionalization | solution mixing | 1 | 83.7 | 2.61 | 142.3 (70%) | 4.70 (80%) | 5860 | 209 |
|  |  |  |  | 0.5 |  |  |  |  | 8120 | 252 |

[a] cf in the bracket represents "covalent functionalization".
[b] The values in the bracket mean the increase of tensile modulus or strength over neat matrix.

FIG. 28

| Sample | $E$ (GPa) | $\sigma$ (MPa) | $\varepsilon$ (%) | $T^a$ (MJ m$^{-3}$) |
|---|---|---|---|---|
| Neat CE | 3.08 ± 0.14 | 101.1 ± 6.0 | 4.0 ± 0.3 | 2.1 ± 0.2 |
| SWNTs(0.2 wt%)/CE | 3.12 ± 0.09 | 90.3 ± 6.8 | 3.4 ± 0.3 | 1.6 ± 0.3 |
| SWNTs(0.5 wt%)/CE | 3.18 ± 0.17 | 75.1 ± 7.8 | 3.1 ± 0.2 | 1.3 ± 0.2 |
| SWNTs(1 wt%)/CE | 3.25 ± 0.11 | 66.2 ± 7.4 | 2.6 ± 0.5 | 0.9 ± 0.3 |
| SWNTs(2 wt%)/CE | 3.27 ± 0.13 | 48.7 ± 4.3 | 2.1 ± 0.2 | 0.6 ± 0.1 |
| SWNTs(5 wt%)/CE | 3.29 ± 0.11 | 40.6 ± 8.2 | 1.8 ± 0.4 | 0.4 ± 0.2 |
| SWNTs(0.2 wt%)/PI/CE | 3.18 ± 0.04 | 108.3 ± 7.7 | 4.3 ± 0.3 | 2.4 ± 0.3 |
| SWNTs(0.5 wt%)/PI/CE | 3.33 ± 0.16 | 93.5 ± 5.5 | 3.6 ± 0.5 | 1.9 ± 0.2 |
| SWNTs(1 wt%)/PI/CE | 3.37 ± 0.10 | 88.4 ± 9.1 | 3.2 ± 0.2 | 1.5 ± 0.1 |
| SWNTs(2 wt%)/PI/CE | 3.41 ± 0.23 | 73.6 ± 6.3 | 2.8 ± 0.5 | 1.2 ± 0.2 |
| SWNTs(5 wt%)/PI/CE | 3.48 ± 0.12 | 64.3 ± 8.9 | 2.2 ± 0.6 | 0.8 ± 0.2 |
| SWNTs(0.2 wt%)/PI-GNE/CE | 3.30 ± 0.13 | 117.8 ± 4.8 | 4.9 ± 0.2 | 3.1 ± 0.1 |
| SWNTs(0.5 wt%)/PI-GNE/CE | 3.40 ± 0.16 | 120.2 ± 6.3 | 4.4 ± 0.3 | 2.9 ± 0.3 |
| SWNTs(1 wt%)/PI-GNE/CE | 3.48 ± 0.05 | 122.3 ± 5.6 | 3.8 ± 0.2 | 2.6 ± 0.2 |
| SWNTs(2 wt%)/PI-GNE/CE | 3.67 ± 0.10 | 117.5 ± 5.2 | 3.6 ± 0.3 | 2.4 ± 0.2 |
| SWNTs(5 wt%)/PI-GNE/CE | 3.81 ± 0.15 | 110.7 ± 6.8 | 3.0 ± 0.6 | 1.9 ± 0.3 |
| SWNTs(0.2 wt%)/PI-BDA/CE | 3.35 ± 0.10 | 123.0 ± 5.7 | 5.2 ± 0.2 | 3.5 ± 0.2 |
| SWNTs(0.5 wt%)/PI-BDA/CE | 3.54 ± 0.06 | 128.2 ± 3.8 | 5.7 ± 0.3 | 3.9 ± 0.3 |
| SWNTs(1 wt%)/PI-BDA/CE | 3.78 ± 0.12 | 136.5 ± 5.4 | 5.2 ± 0.3 | 4.0 ± 0.4 |
| SWNTs(2 wt%)/PI-BDA/CE | 4.05 ± 0.07 | 148.1 ± 7.6 | 4.2 ± 0.4 | 3.6 ± 0.2 |
| SWNTs(5 wt%)/PI-BDA/CE | 4.33 ± 0.14 | 129.4 ± 8.6 | 3.6 ± 0.4 | 2.6 ± 0.3 |

[a] Calculated from the area under the stress-strain curve.

FIG. 30
(A)
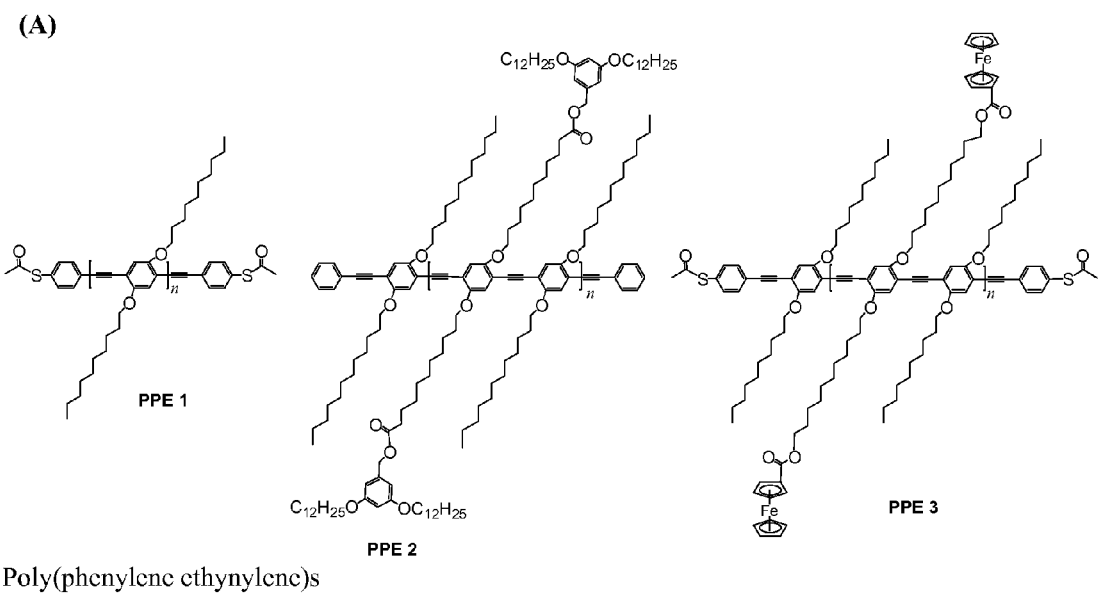
Poly(phenylene ethynylene)s
(B)
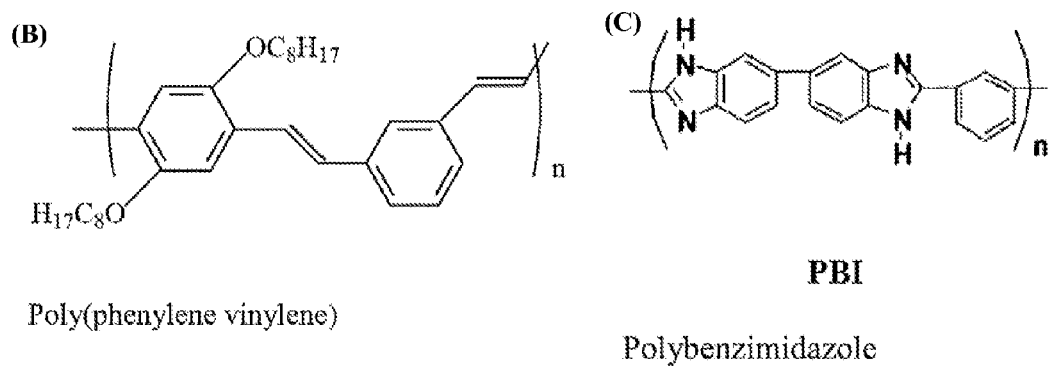
Poly(phenylene vinylene)
(C)
PBI
Polybenzimidazole

FIG. 30 (CONTINUED)
(D)
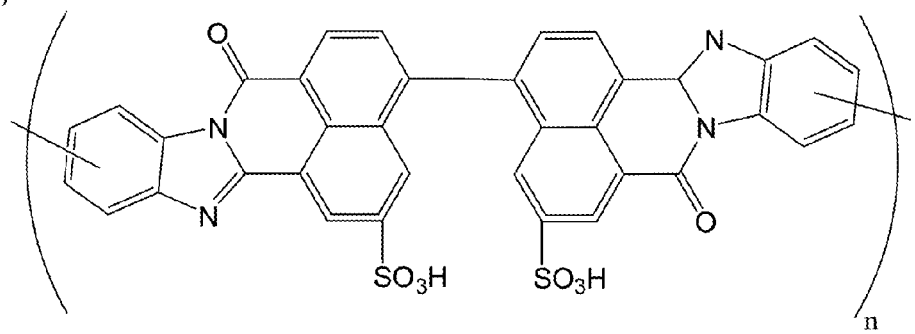
Poly[bis(benzimidazobenzisoquinolinones)]
(E)
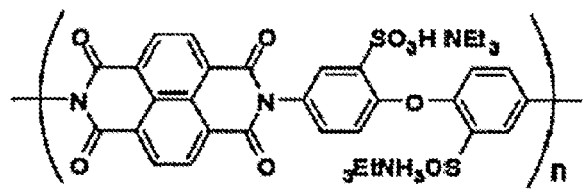
polyimide
(F)
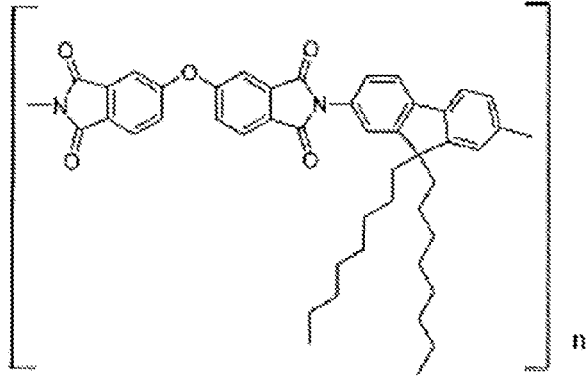
polyimide FIG. 30 (CONTINUED)
(G)
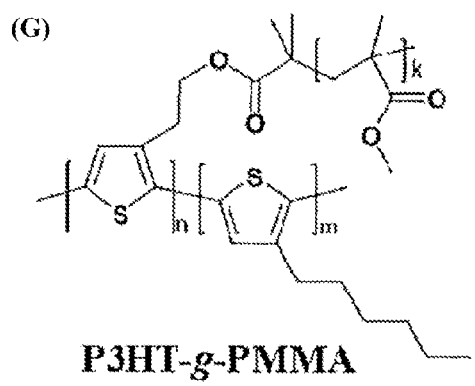
P3HT-g-PMMA
Polythiophene-*graft*-poly(methyl methacrylate)
(H)
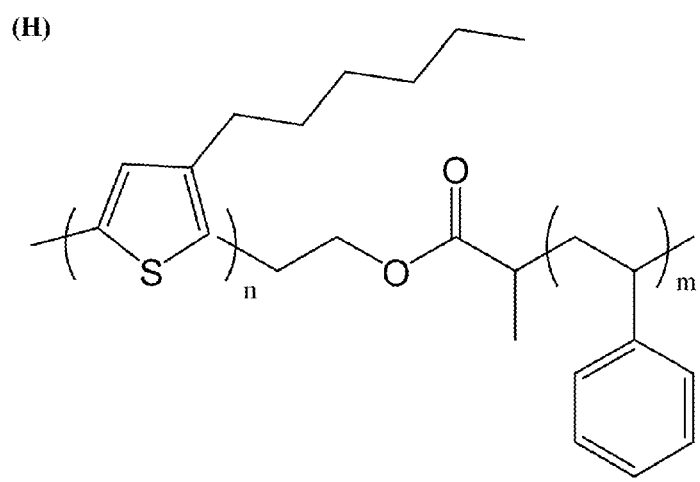
Poly(3-hexylthiophene)-*b*-polysyrene

METHODS FOR DISPERSING CARBON NANOTUBES AND COMPOSITIONS USED FOR THE METHODS

CROSS-REFERENCE TO RELATED APPLICATIONS

This application claims the benefit of priority of U.S. provisional application No. 61/302,808, filed Feb. 9, 2010, the contents of it being hereby incorporated by reference in its entirety for all purposes.

FIELD OF THE INVENTION

The present invention relates to a method of dispersing carbon nanotubes and compositions used for the method. More specifically, it relates to a method of dispersing carbon nanotubes in a thermosetting resin, and compositions used for the method.

BACKGROUND OF THE INVENTION

Thermosetting resins such as cyanate ester (CE) are widely used in the electronics and aerospace industries due to their outstanding adhesive, thermal, mechanical, and electrical properties. However, a drawback of these resins is their brittleness resulting from their highly cross-linked structure, which often restricts their structural applications. Current state of the art techniques include copolymerizing CE with other thermosetting resins, such as epoxy (EP), thereby resulting in a thermostable, processable and tough cyanate ester/epoxy polymer blend which can be produced at a low cost. Another commonly used technique includes adding inorganic nanofillers to the thermosetting resins, which serves to toughen the polymer without compromising their thermal properties.

Carbon nanotubes (CNTs) are deemed to be an ideal material for reinforcing polymer composites due to their low mass density, large aspect ratio (typically between 300-1000), and superior mechanical properties. The mechanical properties of CNT-reinforced composites are improved because CNTs have strength (10-63 GPa) far superior to most thermosetting matrices, and even carbon fibers (about 250 MPa). Furthermore, the nanoscale size of CNTs enables them to be applied as reinforcements in low-dimensional (e.g., 2-D) structures, e.g., polymer fibers, foams, and films, where other conventional microscale fillers would be too large for inclusion. CNTs can also be used to produce multifunctional structural composites with unique thermal, electrical, and optical properties.

Good mechanical properties of CNT/polymer composites, such as a tensile strength of 500-2000 MPa and modulus of 15-169 GPa, have recently been achieved using special nanotubes and/or unconventional processing techniques. With conventional composite processing techniques and common CNTs, however, the properties of resultant CNT-reinforced composites, in particular, those of common thermosetting matrices, have been far inferior than theoretically predicted. For example, Zhu et al. (*Nano Lett.* 2003, 3, 1107) reported a 30% increase in Young's modulus (from 2.03 to 2.63 GPa) and a 14% increase in tensile strength (from 83.2 to 95.0 MPa) for epoxy composites reinforced with 1 wt % fluorinated single-walled carbon nanotubes (SWNTs).

The lower than expected improvement in mechanical properties of CNT/polymer composite can be partially attributed to the poor nanotube dispersion and nanotube/matrix stress transfer. Due to strong van der Waals forces between the nanotubes, CNTs are usually bundled which can result in inter-tube slippage with applied stress and poor mechanical properties of CNT composites. Furthermore, the graphene structure of CNTs is atomically smooth and highly hydrophobic so that stress transfer to a typical polymer composite matrix, which is usually relatively polar, is poor.

To exploit the high mechanical properties of nanotubes in composites, the nanotubes have to be well-dispersed and the nanotube/matrix interface has to be strong. However, there remain challenges for an effective method to disperse carbon nanotubes such as single-walled carbon nanotubes (SWNTs) into individuals or small bundles, as well as the achievement of strong nanotube/matrix interfacial strength, both of which are needed to exploit the excellent mechanical properties of CNTs in structural composites. For widespread industrial application, it would be desirable to produce CNT-reinforced composites using conventional composite processing methods which exploit the ease of processability of polymers, as well as readily available CNTs and polymer matrix materials.

Therefore, there is a need for an improved method to disperse carbon nanotubes, in particular, a method to disperse carbon nanotubes in a thermosetting resin.

SUMMARY OF THE INVENTION

In a first aspect, the present invention refers to a method of dispersing carbon nanotubes in a thermosetting resin, comprising: (a) contacting the carbon nanotubes with a dispersant in a solvent to form a dispersion mixture, wherein the dispersant is a graft polymer comprising a polymeric backbone and a side chain grafted to the polymeric backbone; and (b) adding the thermosetting resin to the dispersion solution to form a resin blend.

In a second aspect, the present invention refers to a composition comprising: a thermosetting resin; a dispersant for dispersing carbon nanotubes in the thermosetting resin, wherein the dispersant is a graft polymer comprising a polymeric backbone and a side chain grafted to the polymeric backbone; and carbon nanotubes.

In a third aspect, the present invention refers to use of a dispersant for dispersing carbon nanotubes in a thermosetting resin, wherein the dispersant is a graft polymer comprising a polymeric backbone and a side chain grafted to the polymeric backbone.

In a fourth aspect, the present invention refers to a method of preparing a composite fiber having carbon nanotubes dispersed therein, comprising: (a) contacting the carbon nanotubes with a dispersant in a solvent to form a dispersion mixture, wherein the dispersant is a graft polymer comprising a polymeric backbone and a side chain grafted to the polymeric backbone; (b) adding the thermosetting resin to the dispersion solution to form a resin blend; (c) evaporating the solvent in the resin blend to obtain a composite of the dispersant and the thermosetting resin having the carbon nanotubes dispersed therein; and (d) forming the composite fiber.

BRIEF DESCRIPTION OF THE DRAWINGS

The invention will be better understood with reference to the detailed description when considered in conjunction with the non-limiting examples and the accompanying drawings, in which:

FIG. 5 are optical micrographs of SWNTs (0.5 wt %)/PI-BDA/R fibers heated at 100° C. for 10 minutes: (A) before and (B) after UV pre-curing (6 hours with on/off cycle of 15 min/15 min); and (C) after post-curing.

FIG. 6 are $^1$H NMR spectra of (A) PI and (B) PI-BDA.

FIG. 16 shows [A a schematic diagram of reactions between CE and EP; (B) Schematic diagram of possible reactions between the —OH groups on PI-BDA and CE.

FIG. 17 is a table showing the mechanical and thermal properties of neat CE-EP and their nanocomposites.

FIG. 18 are graphs showing (A) representative stress-strain curves of neat CE-EP, SWNT(1 wt %)/R, and SWNT(1 wt %)/PI-BDA/R composites. (B) Tensile modulus, (C) tensile strength, (D) elongation at break, and (E) toughness of SWNT/PI-BDA/R and SWNT/R composites with different SWNT loadings.

FIG. 20 is a comparison table of the tensile properties of the composites according to the present invention with reported data for CNT/epoxy composites.

FIG. 28 is a table showing tensile properties, including Young's modulus (E), tensile strength (σ), elongation at break (∈) and toughness (T) of neat CE, SWNT/CE, SWNT/PI/CE, SWNT/PI-GNE/CE and SWNT/PI-BDA/CE composites with different SWNT loadings.

FIG. 30 shows various embodiments of the dispersant and/or polymeric backbone.

DETAILED DESCRIPTION OF THE PRESENT INVENTION

Figure 1:
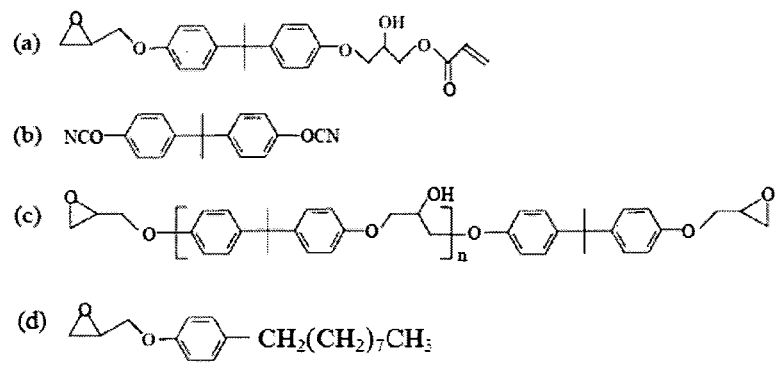
FIG. 1 shows the structures of (a) α-glycidyl-ω-acrylate terminated bisphenol A (GAB), (b) Bisphenol A cyanate ester (CE), (c) Diglycidyl ether bisphenol A epoxy (EP) and (d) Glycidyl 4-nonylphenyl ether (GNE).

In a first aspect, the present invention refers to a method of dispersing carbon nanotubes (CNT) in a thermosetting resin.

As used herein, the term "carbon nanotube" refers to a cylindrical single- or multi-walled structure in which the at least one wall of the structure is predominantly made up of carbon. The terms "carbon nanotube" and "nanotube" are used interchangeably throughout the entire disclosure. Generally, carbon nanotubes can be formed by methods such as arc-discharge, laser ablation and chemical vapor deposition (CVD).

The arc-discharge method creates CNTs through arc-vaporization of two carbon rods placed end to end, separated by a space of about 1 mm, in an enclosure that is usually filled with inert gas at low pressure. A direct current creates a high temperature discharge between the two electrodes. The discharge vaporizes the surface of one of the carbon electrodes, and forms a small rod-shaped deposit of carbon atoms on the other electrode.

In the laser ablation method, CNTs can be prepared by laser vaporization of graphite rods with a catalyst mixture of cobalt and nickel at high temperatures in flowing argon, followed by heat treatment in a vacuum to remove impurities. The initial laser vaporization pulse can be followed by a second pulse, to vaporize the target more uniformly. The use of two successive laser pulses minimizes the amount of carbon deposited as soot. The second laser pulse breaks up the larger particles ablated by the first one, and feeds them into the growing nanotube structure. By varying the growth temperature, the catalyst composition, and other process parameters, the average nanotube diameter and size distribution can be varied.

Chemical vapor deposition (CVD) can also be used to produce the CNTs used in the present invention. It can proceed through the dissociation of carbon-containing molecules catalyzed by transition-metal such as nickel and cobalt. In thermal CVD, a carbon-containing gas mixture is heated by a conventional heat source such as a resistive or inductive heater, furnace, or IR lamp. To initiate the growth of nanotubes, a process gas such as ammonia or nitrogen and a carbon containing gas such as acetylene or methane are bled into the reactor. Nanotubes grow at the sites of the metal catalyst, whereby the carbon-containing gas is broken apart at the surface of the catalyst particle and the carbon is transported to the edges of the particle where it forms the nanotubes. Plasma-enhanced CVD (PECVD) modifies this method by the application of an electrical discharge ignited in the gas mixture.

The number of shells in a carbon nanotube can vary from one, i.e., constituting a single-walled carbon nanotube (SWNT or SWCNT), to as many as 50 shells, in which case it is termed a multi-walled carbon nanotube (MWNT or MWCNT), each pair of adjacent shells in such structure having a spacing between layers that is on the order of ~0.34 nanometers, wherein the shells may be concentric. Examples of carbon nanotubes that can be used in the present invention include, but are not limited to, single-walled carbon nanotubes, double-walled carbon nanotubes (DWNT or DWCNT), multi-walled carbon nanotubes, bundles of carbon nanotubes and any combination thereof. In some illustrated embodiments, the carbon nanotube is a single-walled carbon nanotube.

The carbon nanotube can be a metallic carbon nanotube, or a semiconducting carbon nanotube, or a combination of both. The carbon nanotube may be of any length and diameter. Each carbon nanotube may have a diameter of about 0.3-200 nm, such as about 3-200 nm, about 1-100 nm, about 0.3-50 nm, or about 1-5 nm. In some embodiments, each carbon nanotube can have a length of about 0.5-300 μm, such as about 0.5-200 μm, about 0.5-100 μm or about 0.5-50 μm. Carbon nanotubes are typically 0.3-50 nanometers in diameter and have a length of 0.5-100 micrometers. Atomic Force Microscopy (AFM) and/or Raman Scattering Spectroscopy may for instance be used to determine the dimensions of single-walled carbon nanotubes. Generally, the longer the length of the carbon nanotubes, the greater the tendency of the nanotubes to entangle. As a result, an entangled mass or cluster of carbon nanotubes may be formed.

The carbon nanotubes can be dispersed in a thermosetting resin according to a method of the present invention. A thermosetting resin refers to a resin formed from a cross-linking compound that undergoes cross-linking upon a curing treatment. The curing treatment can take place by application of an external energy, such as heat, light, electron beam or electromagnetic waves such as ultraviolet (UV) light. Examples of a thermosetting resin include, but are not limited to, an acrylic resin, an epoxy resin, an unsaturated polyester resin, a phenol resin, an urea/melamine resin, a polyurethane resin, a silicon resin, an oxetane resin, or a combination thereof.

In some embodiments, the thermosetting resin used is selected from the group consisting of a cyanate ester, epoxy, vinyl ester, polyimide, bismaleimide, and a mixture thereof. In various embodiments, the thermosetting resin is a cyanate ester. In various embodiments, the thermosetting resin is an epoxy. A cyanate ester refers to a compound having the functional group —OCN. It is generally based on a bisphenol or novolac derivative, in which the hydrogen atom of the phenolic OH group is substituted by a cyanide group. Examples of cyanate ester compounds include, but are not limited to, "HF-1" which is a cyanate ester of a bisphenol A type (manufactured by Shanghai Huifeng Technical and Business Co. Ltd), "PRIMASET BA200" which is a cyanate ester of a bisphenol A 60 type (manufactured by Lonza Corporation), "PRIMASET BA 230 S" (manufactured by Lonza Corporation), "PRIMASET LECY" which is a cyanate ester of a bisphenol H type (manufactured by Lonza Corporation), "AroCy L 10" (manufactured by Vantico AG), "PRIMASET PT 30" which 65 is a cyanate ester of a novolak type (manufactured by Lonza Corporation), "AroCy XU-371' (manufactured by Vantico AG), and 'AroCy XP 71787.02L" which is a cyanate ester of a dicyclopentadiene type (manufactured by Vantico AG).

An epoxy refers to a functional group wherein an oxygen atom is directly attached to two carbon atoms forming a three-membered ring. The carbon atoms can already form part of a ring system or can be two adjacent carbon atoms of a chain. Examples of epoxy resins include, but are not limited to, epoxy resins having two or more functional groups in a molecule such as epoxy resins of a bisphenol A type, epoxy resins of a bisphenol F type, phenol novolak epoxy resins, epoxy resins of a bisphenol S type, epoxy resins of an alkylphenol novolak type, epoxy resins of a biphenol type, epoxy resins of a naphthalene type, epoxy resins of a dicyclopentadiene type, epoxy compounds of a condensate of phenol with an aromatic aldehyde having phenolic hydroxyl group, triglycidyl isocyanurate, and alicyclic epoxy resins.

A thermosetting resin comprising a combination of cyanate ester and epoxy can also be used in the present invention. The epoxy resin can impact toughness and flexibility to the cyanate ester resin, which tends to be brittle. Together, the epoxy and cyanate ester resins provide a rapidly curable composition, which when cured, forms an interpenetrating cross-linked network. The weight ratio of cyanate ester to epoxy can be between about 5:1 to about 1:2, or between about 5:1 to about 1:1, or between about 3:1 to about 1:1. Alternatively, the cyanate ester resin can be added to epoxy resin to enhance the thermal and other (e.g. mechanical)

properties of the resultant resin. The weight ratio of epoxy to cyanate ester can be between about 10:1 to about 1:1.

The thermosetting resin can contain an additive or a modifier, such as a toughener or a release agent, to improve the processability and/or performance of the resin. For example, a toughener such as rubber or a thermoplastic can be added to the thermosetting resin to improve the toughness of the resin. As another example, a release agent such as a wax, a higher fatty acid, or a metallic powder can be added to improve the processability of the resin. Apart from the above functional additives and/or modifiers, the thermosetting resin can also contain a colorant including carbon black, red iron oxide or the like which can be added for aesthetic purposes. Other types of additives may be antioxidant, fire retardant additive, plasticizer, conductive filler such as carbon black, cost reducing fillers such as calcium carbonate and reinforcing fibers.

In a method to disperse the carbon nanotubes in the thermosetting resin according to the present invention, the carbon nanotubes may first be contacted with a dispersant in a solvent to form a dispersion mixture. The solvent can be a non-polar solvent, a polar solvent, a mixture of two or more non-polar solvents or a mixture of two or more polar solvents. A non-polar solvent refers to a solvent that has no measurable dipole. Specifically, it refers to a solvent having a dielectric constant of less than 15, less than 10 or between about 5 to about 10. Examples of a non-polar solvent include, but are not limited to, alkanes such as butane, hexane, octane, cyclohexane, aromatic compounds such as benzene and toluene, diethyl ether, chloroform and 1,4-dioxane.

A polar solvent refers to a solvent that exhibits polar forces on solutes which can happen as a result of high dipole moment, wide separation of charges or tight association such as water, alcohols and acids. The solvents typically have a measurable dipole, and have a typical dielectric constant of at least 15, at least about 20 or between 20 to about 30. The polar solvent can be aprotic or protic. A polar aprotic solvent refers to a solvent that does not have a dissociable $H^+$ ion. Examples of a polar aprotic solvent include, but are not limited to, ethyl acetate, tetrahydrofuran (THF), dichloromethane (DCM), N-methyl-2-pyrrolidone (NMP), ketones such as acetone, methyl ethyl ketone and methyl isobutyl ketone, acetonitrile, dimethylformamide (DMF) and dimenthyl sulfoxide (DMSO).

A polar protic solvent, on the other hand, refers to a solvent that has a dissociable $H^+$ ion. Typically, the solvent carries a hydrogen bond between an oxygen such as in the case of a hydroxyl (—OH) group, or a nitrogen such as in the case of an amine ($NH_2$) group. Examples of a polar protic solvent include, but are not limited to, alcohols such as methyl alcohol, ethyl alcohol, n-propyl alcohol, isopropyl alcohol, n-butyl alcohol, sec-butyl alcohol, t-butyl alcohol, isobutyl alcohol and diacetone alcohol, glycols such as ethylene glycol, diethylene glycol, triethylene glycol, propylene glycol, butylene glycol, hexylene glycol, 1,3-propanediol, 1,4-butanediol, 1,2,4-butanetriol, 1,5-pentanediol, 1,2-hexanediol and 1,6-hexanediol, formic acid, acetic acid and water.

In some embodiments, the solvent used are N,N'-dimethylformamide, N-methyl-2-pyrrolidone, and 1,2-dichloroethane.

The dispersion mixture contains a dispersant. The term "dispersant" as used herein refers to an agent that disperses, i.e. suspends a substance in a medium. For example, in the context of the present application, the dispersant can disperse or suspend carbon nanotubes in a medium such as a solvent. Using the dispersant, the carbon nanotubes can be dispersed into individual nanotubes or small bundles, instead of being in an entangled mass.

The dispersant can be a graft polymer. The term "graft polymer" refers to a polymer with one or more species of blocks connected to the polymeric backbone as side chains, the side chains having constitutional or configurational features that differ from those of the main chain. The degree of dispersity in solution can be determined from the ultra violet-visible-near infrared (UV-VIS-NIR) spectroscopy, atomic force microscopy (AFM) or transmission electron microscopy (TEM) by a person skilled in the art.

The graft polymer can comprise a polymeric backbone and a side chain grafted to the polymeric backbone. The term "polymeric backbone" refers to the main chain to which all other chains may be regarded as being pendant. The polymeric backbone can be any organic polymer. Examples of polymeric backbone include, but are not limited to, polyacrylate, polyester, polyimide, polysiloxane, polyethylene, polyvinyl ether, polyvinyl esters, polyvinyl halides, polystyrene, polyvinyl alcohol, polyamino acids, polyanhydrides, polyorthoesters, polyphosphoesters, polylactones, polyhydroxy acids, polyalkylenes, polychloroprene, polycarbonate and derivatives or copolymers thereof. The polymers may also include various substitutions, additions of functional groups, hydroxylations, oxidations, reductions, or other modifications routinely made by those skilled in the art. The polymeric backbone can comprise at least one aromatic ring. For example, the polymeric backbone can comprise a polycyclic aromatic hydrocarbon such as anthracene, coronene and triphenylene, carbazole, naphthalene, pyrazine, pyridazine, or pyrimidine. In some embodiments, the polymeric backbone is a functionalized polyimide, a poly(phenylene ethynylene), a poly(phenylene vinylene), a polythiophene, or a polybenzimidazole.

The term "side chain" refers to an oligomeric or polymeric offshoot from a macromolecular chain, e.g. the polymeric backbone chain of the polymers of the invention. The side chain may be any composition that can be grafted onto the polymeric backbone. In some embodiments, the grafted side chain may itself be a polymer, and the composition of the polymer of the side chain may be the same or different than the polymeric backbone. The side chain may comprise any number of monomeric units having any molecular weight, for example, between 1 and 100 repeat units. One or more side chains, such as two, three or four side chains can be grafted to the polymeric backbone. In some embodiments, more than one side chain is grafted to the polymeric backbone. Each side chain can comprise the same or different combination of monomeric units. The side chain may be of any length, depending on the type of and number of monomeric units.

The side chain may comprise at least one phenolic group or bisphenolic group. For example, the side chain may be phenol itself or can be an alkyl phenol with 1-3 alkyl groups each of 1-10 carbon atoms, such as methyl, ethyl, isopropyl and tertiary butyl. In some embodiments, the grafted side chain is diglyceryl acrylate or glyceryl 4-nonylphenyl ether. In some embodiments, the diglyceryl acrylate is bisphenol A diglyceryl acrylate, and the nonylphenyl ether is glyceryl 4-nonylphenyl ether. Alternatively, the side chain may comprise functionalized aromatic groups such as naphthalenic, anthracenic, or pyrenic group. The grafted side chain may also include a functional group to react with the thermosetting resin. Examples of functional groups include, but are not limited to, hydroxy, amino, cyano, epoxy, acrylate, methacrylate, maleimide, anhydride, and nitro groups. The side chain may also include various substitutions, additions of functional groups, hydroxylations, oxidations, reductions, or other modifications routinely made by those skilled in the art.

In some embodiments, the graft polymer has at least one conjugated portion. In such an arrangement, electron density or electronic charge may be delocalized and conducted along the conjugated portion. In some embodiments, the polymer can be a conjugated polymer in which substantially all of the polymeric backbone is conjugated. Each p-orbital that are conjugated can overlap with adjacent conjugated p-orbitals. In a delocalized structure, the electrons in the p-orbitals may cover multiple atom centers, such that the electrons in orbitals between adjacent atoms are shared, creating a chemical bond (pi-bond) between the adjacent atoms.

In some embodiments, the dispersant comprises a polymeric backbone comprising at least one aromatic ring. In some embodiments, the polymeric backbone comprises at least one imide group. In various embodiments, the polymeric backbone comprises at least one imide group linked to an aromatic ring. In some embodiments, the polymeric backbone is selected from the group consisting of polyimide, poly(phenylene ethynylene), poly(phenylene vinylene), polythiophene, and polybenzimidazole.

In some embodiments, the dispersant comprises a grafted side chain comprising at least one phenolic group or bisphenolic group. In some embodiments, the grafted side chain comprises at least one hydroxyl group or carboxylic acid group. In various embodiments, the grafted side chain comprises diglyceryl acrylate or glyceryl 4-nonylphenyl ether.

In some illustrated embodiments, the dispersant is polyimide-graft-bisphenol A diglyceryl acrylate (PI-BDA), wherein the polymeric backbone is polyimide and the grafted side chain is bisphenol A diglyceryl acrylate. The chemical structure of the dispersant PI-BDA is shown in FIG. 2(a). In some illustrated embodiments, the dispersant is polyimide-graft-glyceryl 4-nonylphenyl ether (PI-GNE), wherein the polymeric backbone is polyimide and the grafted side chain is glyceryl 4-nonylphenyl ether. The chemical structure of the dispersant PI-GNE is shown in FIG. 2(b). The number of repeat unit (n) in the chemical structure may range from 100 to 100,000, such as from 100 to 80,000, or from 100 to 50,000, or from 100 to 10,000.

In various embodiments, the dispersants and/or polymeric backbones comprise chemical structures as shown in FIG. 30.

The polymeric backbone of the dispersant can bind to the carbon nanotubes. The type of binding between the dispersant and the nanotubes can be covalent or non-covalent. In some embodiments, the polymeric backbone can form a non-covalent interaction with the carbon nanotubes. The non-covalent interaction can be a π-π interaction, hydrogen bond, a charge transfer interaction, a dipole-dipole interaction or a van der Waals interaction. In some embodiments, the polymeric backbone binds to the carbon nanotube by π-π interaction. π-π interactions are caused by intermolecular overlapping of p-orbitals in π-conjugated systems, and becomes stronger as the number of π-electrons increases. As a result of binding to the carbon nanotubes, the dispersant can adsorb to and be present as a layer on the surface of the carbon nanotubes.

The grafted side chain may prevent aggregation of the carbon nanotubes. For example, the side chain that is grafted on the polymeric backbone can impart repulsive forces to the carbon nanotubes via steric hindrance, thereby preventing aggregation of the carbon nanotubes. This can result in dispersion of the carbon nanotubes.

The dispersant can be contacted with the carbon nanotubes in the solvent. The amount of dispersant added can depend on the type of dispersant, the type of solvent and the extent of dispersion required. Generally, the weight ratio of dispersant to carbon nanotubes can be between about 1:5 to about 5:1, or about 1:2 to about 2:1, or about 1:1.

The method to disperse the carbon nanotubes in the thermosetting resin according to the present invention comprises adding the thermosetting resin to the dispersion mixture to form a resin blend. As the carbon nanotubes can be dispersed by the dispersant in the dispersion mixture, when a thermosetting resin is added to the dispersion mixture to form a resin blend, the carbon nanotubes can also be dispersed i.e. present as individual nanotubes or small bundles in the thermosetting resin. The polymeric backbone of the dispersant can bind to the carbon nanotube to form a layer on the carbon nanotube, which can improve the compatibility between the nanotube and the thermosetting resin. In some embodiments, the side chain of the dispersant reacts with the thermosetting resin, which can result in stronger interfacial bonding between the carbon nanotube and the thermosetting resin.

In some illustrated embodiments, for example, the dispersant is PI-BDA, which comprises polyimide (PI) polymeric backbone and a bisphenol A diglyceryl acrylate (BDA) side chain containing a hydroxyl (—OH) group, The polyimide (PI) polymeric backbone can bind to the carbon nanotubes via non-covalent interaction such as π-π interaction, while the side chain on the dispersant can provide steric hindrance to the carbon nanotubes, thereby resulting in dispersion of the nanotubes. When a thermosetting resin of cyanate ester, which comprises a —OCN group is added, the —OH group on the side chain of the dispersant can react with the —OCN group on the cyanate ester to form a covalent bond between the dispersant and the cyanate ester. This covalent bond translates into a stronger interfacial bond between the dispersed carbon nanotubes and the cyanate ester thermosetting resin, since the dispersant is bonded to the carbon nanotubes via the PI backbone.

The method according to the present invention can further comprise homogenizing the dispersion mixture to form a homogeneous dispersion solution prior to adding the thermosetting resin to the dispersion solution to form a resin blend. Homogenizing the dispersion mixture can be carried out, for example, by mechanical agitating such as stirring and shaking, sonicating, or heating.

In some embodiments, the dispersion mixture is homogenized by sonicating. Sonication refers to the application of sound or ultrasound energy to agitate a sample. This can be performed using a tip sonicator or sonicator bath. Sonication can be carried out at any temperature, such as about −10° C. to about 100° C., or about −10° C. to about 50° C., or about −10° C. to about 25° C. In some embodiments, sonication is carried out at a temperature of between −10° C. to +10° C. Sonication can be carried out for any length of time, depending on the type of sample and degree of homogenization required. For example, sonication can be carried out for from about 1 minute to about 120 minutes, from about 1 minute to about 60 minutes, or from about 5 minutes to about 45 minutes. In some embodiments, sonication is carried out using a tip sonicator for from about 3 minutes to about 30 minutes, or about 5 minutes to about 10 minutes. In some embodiments, sonication is carried out using a sonicator bath for from about 10 minutes to about 60 minutes, or from about 25 minutes to about 30 minutes.

The method according to the present invention can further comprise homogenizing the resin blend, which can be carried using a method described herein for homogenizing the dispersion mixture.

In a second aspect, the present invention refers to a composition comprising: a thermosetting resin; a dispersant for dispersing carbon nanotubes in the thermosetting resin, wherein the dispersant is a graft polymer comprising a polymeric backbone and a side chain grafted to the polymeric backbone; and carbon nanotubes.

In a third aspect, the present invention refers to use of a dispersant for dispersing carbon nanotubes in a thermosetting resin, wherein the dispersant is a graft polymer comprising a polymeric backbone and a side chain grafted to the polymeric backbone.

The graft polymer comprising a polymeric backbone and a side chain grafted to the polymeric backbone can be defined as above.

Also encompassed by the present invention are specific dispersants that can be used in the methods of the invention. The present invention is thus also directed to polyimide-graft-bisphenol A diglyceryl acrylate and polyimide-graft-glyceryl 4-nonylphenyl ether.

In a fourth aspect, the present invention refers to a method of preparing a composite fiber having carbon nanotubes dispersed therein. As used herein, the term "fiber" refers to any generally elongated member fabricated from any suitable material such as polymer. The term "composite fiber" refers to a fiber that is made up of two or more different material. For example, a composite fiber can be a fiber that is made up of two or more different polymers.

The method can comprise contacting the carbon nanotubes with a dispersant in a solvent to form a dispersion mixture, wherein the dispersant is a graft polymer comprising a polymeric backbone and a side chain grafted to the polymeric backbone. A thermosetting resin can be added to the dispersion solution to form a resin blend. The method can comprise evaporating the solvent in the resin blend to obtain a composite of the dispersant and the thermosetting resin having the carbon nanotubes dispersed therein.

Evaporation the solvent in the resin blend can take place under room temperature and conditions. Alternatively, evaporation of solvent from the resin blend can also take place under application of heat to the resin blend, in case a faster rate of evaporation is required. Heating the resin blend can take place on a hot plate or in a vacuum oven. Depending on the type of resin blend, for example, evaporation of the solvent can take place at different temperature and/or time. In some embodiments, evaporation of solvent is carried out by heating the resin blend at a temperature of about 30-200° C. In various embodiments, evaporation of solvent is carried out by heating the resin blend at a temperature of about 60-200° C. In some embodiments, evaporation of solvent comprises heating the resin blend for about 0.5-5 hours. In various embodiments, evaporation of solvent comprises heating the resin blend for about 0.5-3 hours.

After the solvent is evaporated from the resin blend, a composite of the dispersant and the thermosetting resin having the carbon nanotubes dispersed therein can be obtained. Using the composite, the composite fiber having carbon nanotubes dispersed therein can be formed. The composite fiber can be formed by extrusion, molding or spinning the composite in a spinning device. The composite fiber is usually formed in the form of a cylindrical thread. In some embodiments, the composite fiber is formed by extruding the composite. In some embodiments, the composite fiber is formed by spinning the composite. Parameters such as rate of spinning and rate of dispensing the composite can be varied to change the dimensions such as length and diameter of the fiber.

The thermosetting resin in the composite fiber can be cured by exposing the composite fiber to an UV lamp of in a convection oven. As already mentioned herein, curing can be carried out using heat, light, electron beam or electromagnetic waves such as ultraviolet (UV). Curing of the thermosetting resin can be carried out on the thermosetting for any number of times, for example, one time, or repeated two, three or four times. Choice of curing method can depend on the type of thermosetting present in the composite fiber.

In some embodiments, the thermosetting resin in the composite fiber is cured by UV. The UV waves can be applied to the composite fiber by exposing the composite fiber to an UV lamp or in a convection oven. In some embodiments, UV curing is achieved by exposing the composite fiber to an UV lamp from about 5 to about 100 mW/cm$^2$. In some embodiments, UV curing is achieved by exposing the composite fiber to an UV lamp at about 30 mW/cm$^2$. UV curing can be carried out for any length of time that is sufficient to cure the thermosetting resin. In some embodiments, UV curing is carried out for about 0.5 to about 10 hours. In some embodiments, UV curing is carried out for about 6 hours.

In some embodiments, the thermosetting resin in the composite fiber is cured by heat. In some embodiments, heat can be applied to the composite fiber by exposing the thermosetting resin in a convention oven at a temperature of about 80° C. to about 350° C. For example, heat can be applied to the composite fiber by exposing the thermosetting resin in a convention oven at a temperature of about 110° C. to about 250° C. Heat curing can be carried out for any length of time that is is sufficient to cure the thermosetting resin. In some embodiments, heat curing is carried out for about 30 minutes to about 48 hours. In some embodiments, heat curing is carried out for about 30 minutes to about 24 hours.

The method as described herein can further comprise homogenizing the dispersion mixture to form a homogeneous dispersion solution prior to addition of the resin blend. The method as described herein can further comprise homogenizing the resin blend prior to evaporating the solvent in the resin blend. Methods for homogenizing the dispersion mixture and resin blend have already been discussed herein.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Example 1

Materials 3,3'-Dihydroxy-4,4'-diaminobiphenyl (HAB, 97%) was purchased from Tokyo Chemical Industry. α-Glycidyl-ω-acrylate terminated bisphenol A (GAB) with structure shown in FIG. 1(a) and with a molecular weight of 450 was supplied as Ebecryl® 3605 from UCB chemicals (Malaysia). It was freeze-dried at −55° C. for 2 days before use. 4,4'-Oxydiphthalic anhydride (ODPA, 97%), 4-(dimethylamino) pyridine (DMAP, 99%), butylated hydroxytoluene (BHT, 99%), sodium hydrogen carbonate ($NaHCO_3$, 99.5%), N,N'-dimethylacetamide (DMAc), xylene, dimethyl sulfoxide (DMSO), N,N'-dimethylformamide (DMF), Glycidyl 4-nonylphenyl ether (GNE, technical grade, FIG. 1(d)) and methanol were obtained from Sigma-Aldrich. DMAc and DMSO were distilled over calcium hydride and xylene over sodium wire before use. All other chemicals were used as received unless otherwise specified.

Bisphenol A cyanate ester resin (CE) shown in FIG. 1(b) was purchased from Shanghai Huifeng Technical & Business Co., Ltd. (Shanghai, China) with the trade name HF-1. Diglycidyl ether bisphenol A epoxy resin (EP) shown in FIG. 1(c), was purchased from Wuxi Resin Factory (China) with the trade name E20.

HiPCO SWNTs (super pure grade) were purchased from Carbon Nanotechnologies Inc. (CNI) and were used as received. HiPCO SWNTs were only used for the UV-vis-NIR absorption characterization. For other tests, the SWNTs were purchased from Chengdu Research Institute of Organic Chemistry (China); they were produced by the chemical vapor deposition (CVD) method and have diameters of 1-2 nm, lengths of 5~30 μm and purity of ~90%.

Example 2

Figure 2:
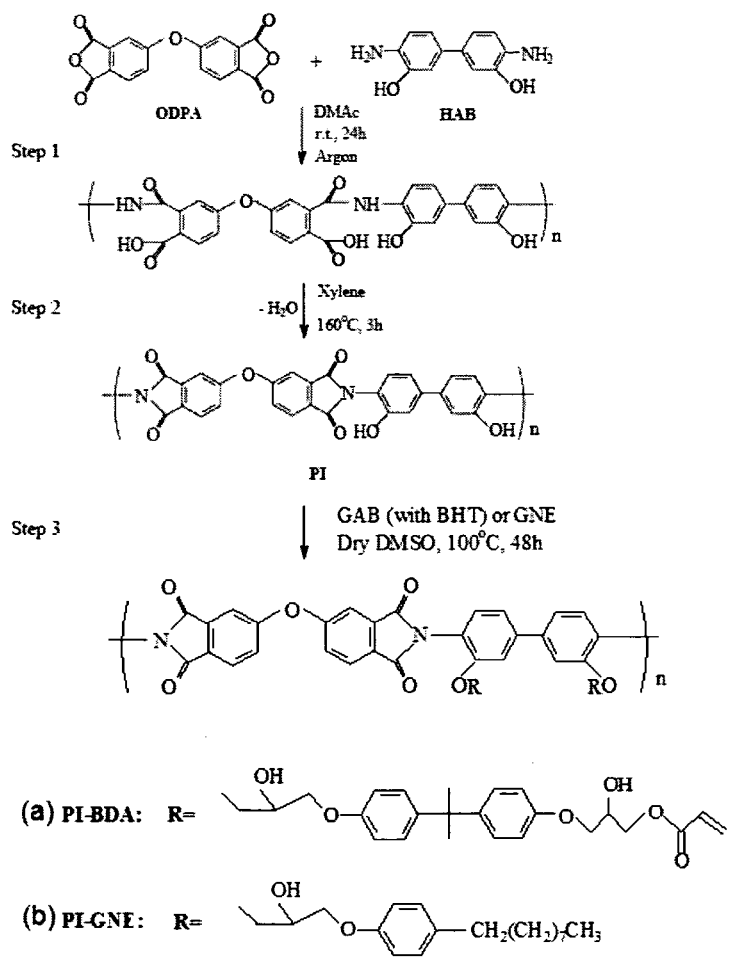
FIG. 2 shows a scheme for synthesis of hydroxyl polyimide (PI), polyimide-graft-bisphenol A diglyceryl acrylate (PI-BDA) and polyimide-graft-glycidyl 4-nonylphenyl ether (PI-GNE).

Synthesis of Hydroxyl Polyimide (PI) (Steps 1 and 2 of FIG. 2)

FIG. 2 shows the reaction scheme used in the example. In Step 1 of FIG. 2, 3,3'-Dihydroxy-4,4'-diaminobiphenyl (HAB) (1.080 g, 5.00 mmol) was dissolved in 40 mL of freshly distilled N,N'-dimethylacetamide (DMAc) in a round-bottom flask under argon protection. After the solution was cooled at 0° C. for 15 min, 4,4'-Oxydiphthalic anhydride (ODPA) (1.550 g, 5.00 mmol) was added to the solution with vigorous stirring. The mixture was then warmed to room temperature and magnetically stirred for 24 hours under argon atmosphere to form a poly(amic acid) (PAA) solution.

In Step 2 of FIG. 2, dry xylene (40 mL) was added to the solution and stirred at 160° C. for 3 hours to eliminate the water formed in the imidization reaction. After cooling to room temperature, the reaction mixture was added dropwise into a large excess of methanol to precipitate the polyimide (PI). The precipitate was filtered and repeatedly washed with a large amount of methanol and then with tetrahydrofuran (THF). The separated precipitate was dried at 80° C. under vacuum for 24 hours. The yield was 2.040 g (83% yield).

Example 3

Synthesis of Polyimide-graft-Bisphenol A Diglyceryl Acrylate (PI-BDA) (Step 3a of FIG. 2)

In Step 3a of FIG. 2, 4-(dimethylamino) pyridine (DMAP) was added as the catalyst and butylated hydroxytoluene (BHT) was added to prevent homopolymerization of acrylate double bond on the bisphenol A diglyceryl acrylate (BDA) side chain. Typically, polyimide (PI) (0.588 g, 1.20 mmol of repeat unit) was dissolved in 40 mL of dry dimethyl sulfoxide (DMSO) at 60° C. in a round-bottom flask with a water condenser under argon atmosphere. After dissolution of 4-(dimethylamino) pyridine (DMAP) (0.293 g, 2.40 mmol), a solution of α-Glycidyl-ω-acrylate terminated bisphenol A (GAB) (1.188 g, 2.64 mmol) together with butylated hydroxytoluene (BHT) (0.018 g, 0.08 mmol) in 20 mL of dry DMSO was added, and the resulting mixture was stirred at 100° C. for 48 h. After removal of some DMSO with a rotary evaporator, the mixture was added dropwise into bulk methanol with vigorous stirring. The precipitate was filtered and washed several times with 0.2 M hydrochloric acid (HCl), then with 5% sodium bicarbonate ($NaHCO_3$) solution, and finally with water. The side-chain grafted polyimide (PI-BDA), product was dried under vacuum at room temperature for 48 hours. The yield was 0.850 g (51% yield).

Example 4

Fabrication of Fibers

Figure 3:
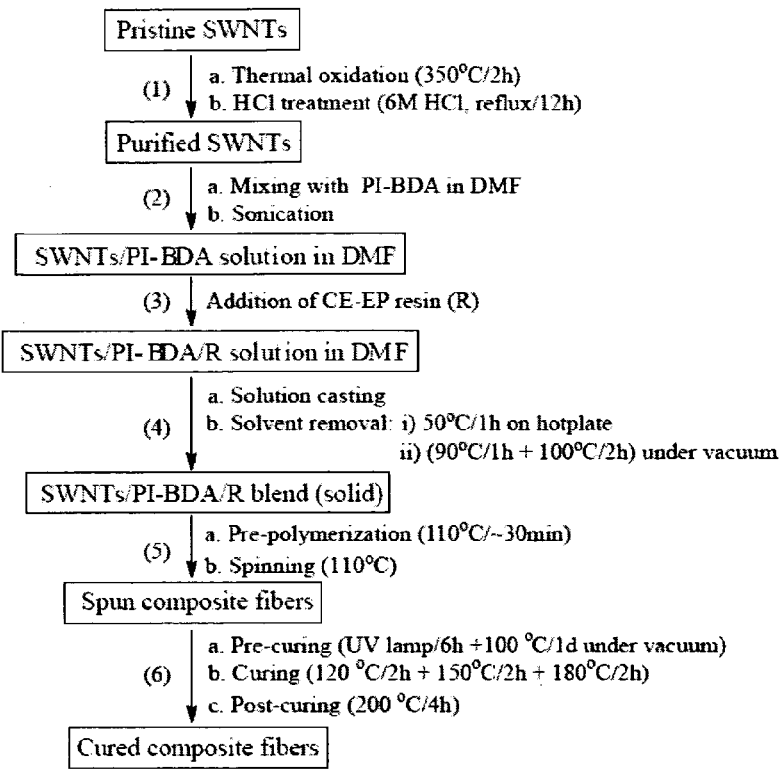
FIG. 3 shows a processing route used to fabricate composite fibers according to the present invention.

FIG. 3 shows a schematic diagram of the processing route used for fabrication of the SWNT-reinforced CE-EP composite fibers.

Step 1 depicts purification of pristine SWNTs as also outlined in Example 5.

Step 2 depicts preparation of SWNT/PI-BDA dispersion as also outlined in Example 6. The resulting stable and homogeneous solution had a SWNT concentration of 1 mg/mL.

Step 3 depicts addition of CE-EP matrix to measured quantities of SWNT/PI-BDA dispersion to produce precursor solutions of SWNTs/PI-BDA/resin (SWNTs/PI-BDA/R) composite fibers with different SWNT loadings as also outlined in Example 7.

Step 4 depicts preparation of SWNT/PI-BDA/R blend as also outlined in Example 8.

Step 5 depicts preparation of composite fiber as also outlined in Example 9.

Step 6 depicts preparation of cured composite fiber as also outlined in Example 10.

Example 5

Purification of SWNTs (Step 1 of FIG. 3)

SWNTs were purified with thermal oxidation (350° C. for 2 hours in air) followed by acid treatment (refluxing in 6 M hydrochloric acid (HCl) for 12 hours before use. HiPCO SWNTs (super pure grade) were purchased from Carbon Nanotechnologies Inc. (CNI) and were used as received. HiPCO SWNTs were only used for the UV-vis-NIR absorption characterization.

Example 6

Preparation of SWNT Dispersions (Step 2 of FIG. 3)

To prepare SWNT/PI-BDA dispersion, 10 mg of purified SWNTs and 10 mg of polyimide-graft-bisphenol A diglyceryl acrylate (PI-BDA) were first added into 10 mL of N,N'-dimethylformamide (DMF). Then the mixture was sonicated with a high power tip sonicator (500 W, 35%, Vibra-Cell™, Sonics) for 10 min followed by further sonication in a low power sonicator bath (60 W, S30H, Elma) at 0° C. for 30 min. The resulting stable and homogeneous solution had a SWNT concentration of 1 mg/mL (the mass ratio of SWNTs/PI-BDA is 1:1). Pristine SWNT suspension in DMF was prepared by the same procedure without the addition of PI-BDA. For Raman characterization, the SWNT/PI-BDA solution was filtered and washed thoroughly with DMF to remove any free surfactant, and the resultant powder was dried.

To prepare SWNTs/PI-BDA solution for UV-vis-NIR analysis, 2 mg HiPCO SWNTs and 4 mg PI-BDA were mixed in 10 mL DMF, and the mixture was sonicated with a tip sonicator for 10 min followed by sonication with a bath sonicator for 30 min. (HiPCO SWNTs were used in this part of the experiment because Chengdu SWNTs used for the composites measurements below do not have distinct UV-vis-NIR peaks.) After high-speed centrifugation, the supernatant was used for UV-vis-NIR characterization. For comparison, SWNTs solution dispersed with SDS (1 wt %) in D2O was also prepared using a similar procedure.

Example 7

Preparation of SWNT/PI-BDA/R Dispersions (Step 3 of FIG. 3)

SWNTs/PI-BDA solution (1 mg SWNTs/mL) was first prepared via the methods described in the above examples. Bisphenol A cyanate ester-epoxy (CE-EP) matrix was prepared by mixing CE (70 wt %) and EP (30 wt %) at 110° C. for 30 min. A 2-g portion of CE-EP matrix was added to measured quantities of SWNT/PI-BDA dispersion to produce precursor solutions of SWNTs/PI-BDA/resin (SWNTs/PI-BDA/R) composite fibers with different SWNT loadings.

Example 8

Preparation of SWNT/PI-BDA/R Blend (Step 4 of FIG. 3)

After sonication in a sonicator bath for 10 min, the solution was cast onto glass substrates, which were placed on a hot plate at about 50° C. for 1 hour to slowly remove most of the DMF. The glass substrates were then transferred to a vacuum oven and dried under vacuum at 90° C. for 1 hour and 100° C. for 2 hours.

Example 9

Preparation of Composite Fibers (Step 5 of FIG. 3)

Subsequently, the blend was collected from the glass substrates and the bubbles were removed using a vacuum oven (110° C. for 15 minutes). The blend was subjected to a prepolymerization reaction at 110° C. for about 30 minutes to achieve a suitable viscosity, which was experimentally determined to be 50-80 Pa·s. The blend was then used to fabricate SWNT/PI-BDA/R composite fibers using a reactive spinning device.

Figure 4:
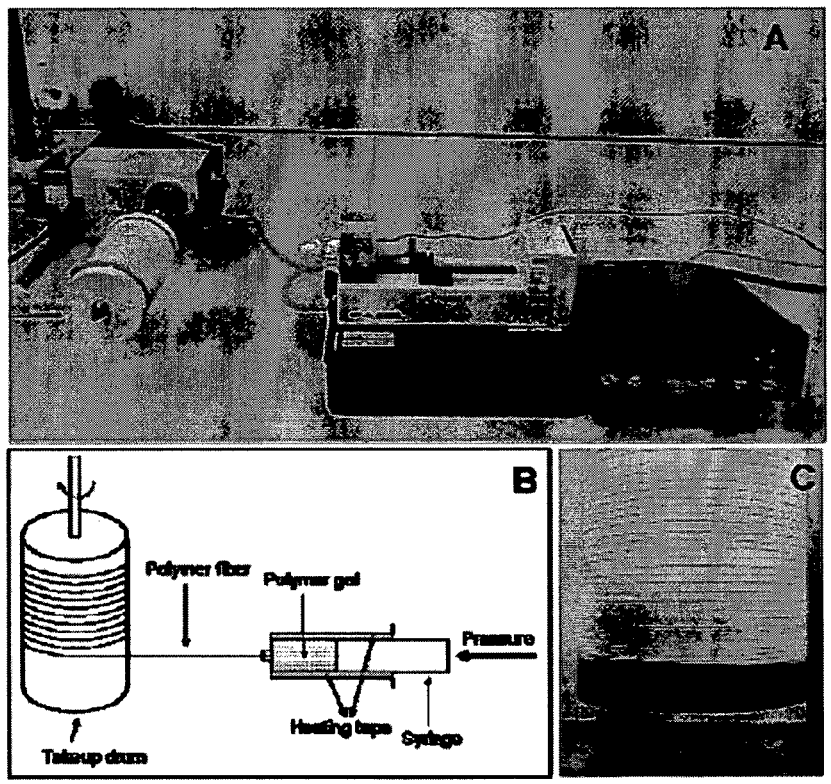
FIG. 4 are photographs showing (A) reactive spinning apparatus, (B) schematic of reactive spinning process, and (C) spool of SWNTs (1 wt %)/PI-BDA/R fibers collected on a takeup drum.

FIG. 4 shows the reactive spinning device used, in which (A) a photograph of the device, (B) schematic diagram of the reactive spinning process and (C) a spool of SWNT(1 wt %)/PI-BDA/R fiber collected on a takeup drum. Pre-polymerized resin was filled in a syringe which was wrapped with heating tape to control the temperature. Fibers were extruded from the spinneret by syringe pump, then air-cooled, and finally drawn under tension by a rotating Teflon drum located about 20 cm from the spinneret. The spinning was conducted at an injection rate of 80 mL/h at 110° C. The fiber diameter measured by optical microscopy was approximately 90 μm.

Example 10

Preparation of Cured Composite Fibers (Step 6 of FIG. 3)

After spinning, the fibers were pre-cured for 6 hours under a UV lamp (intensity of 30 mW/cm$^2$, with on/off cycle of 15 min/15 min) which was filtered with a dish of water for 6 h (with on/off cycle of 15 min/15 min), and then further thermal cured at 100° C. for 1 day under vacuum followed by 120° C. for 2 hours, 150° C. for 2 hours, 180° C. for 2 hours, and post-curing of 200° C. for 4 hours at atmospheric pressure.

FIG. 5 are optical photographs of SWNT (0.5 wt %)/PI-BDA/R fibers heated at 100° C. for 10 minutes (A) without UV-curing, (B) with UV-curing and (C) after post-curing. As can be seen from FIG. 5(A), spun fibers without UV pre-curing fused at points of contact with other fibers at the thermal cure temperature of 100° C. and their cross-sectional shape became elliptical. Comparatively, when the spun fibers are UV-cured, the fibers did not fuse and retained their round cross-section after thermal curing and post curing (FIGS. 5(B) and (C)).

Neat CE-EP fibers and pristine SWNTs-reinforced fibers (SWNTs/R) were also prepared using a similar method.

Example 11

Verifying the Reaction Between PI-BDA and CE

To verify with Fourier transform infrared spectrometer (FTIR), the addition reaction between hydroxyl group (—OH) on PI-BDA with the Bisphenol A cyanate ester (CE), PI-BDA/CE blend (30/70, w/w) was first dissolved in N,N'-dimethylformamide (DMF), then several drops were cast onto a potassium bromide (KBr) pellet. The DMF was removed under vacuum at 80° C. for 2 hours. Then the sample was characterized by FTIR before and after heating at 120° C. for 1 hour. To verify the reaction using $^1$H NMR, PI-BDA/CE blend (30/70, w/w) was dissolved in deuterated dimethylsulfoxide (DMSO-d$_6$), and $^1$H NMR spectra of the sample were collected before and after heating at 120° C. for 1 hour.

Example 12

Characterization $^1$HNMR spectra of PI, PI-BDA, and PI-BDA/CE (30/70, w/w) blend were recorded on a Bruker (300 MHz) NMR instrument using deuterated dimethylsulfoxide (DMSO-d$_6$) as solvent and tetramethylsilane as reference.

Fourier transform infrared (FT-IR) spectra were obtained on a Nicolet 5700 FT-IR instrument equipped with attenuated total reflectance (ATR) accessory. All measurements were made over the wavenumber range 400-4000 cm$^{-1}$ at room temperature. Fourier transform infrared (FT-IR) spectra of PI-BDA/CE (30/70, w/w) blend before and after heating at 120° C. for 1 hour were recorded on a Nicolet 5700 FT-IR instrument.

Gel permeation chromatography (GPC) analyses for determination of the molecular weight were performed on a Shimadzu LC-20A Series GPC system equipped with a pump, a BC-PL gel mixed column (molecular weight limits ranging from 200-400,000 g/mol) and a RID-10A refractive index detector. DMF with 0.02 M LiBr was used as eluent at a flow rate of 1 mL/min at 60° C. Analysis was based on calibration against polystyrene standards.

Thermogravimetric analysis (TGA) of neat CE-EP and its composites was performed on a Netzsch STA 409 PG/PC instrument under a nitrogen atmosphere, with a heating rate of 10° C./min from 50 to 800° C.

Glass-transition temperatures ($T_g$) of neat CE-EP and its composites were determined from differential scanning calorimetry (DSC) performed on a Mettler Toledo DSC 822e instrument under nitrogen gas ($N_2$) at a heating/cooling rate of 20° C./min from 50 to 230° C. To diminish the effects of uncompleted reactions and thermal history, samples of about 7 mg were first heated from 50 to 230° C., held at 230° C. for 5 min and then cooled. After cooling to 50° C., samples were reheated to 230° C. The process was performed at a heating/cooling rate of 20° C./min with a $N_2$ purge of 50 mL/min. The $T_g$ was calculated from the midpoint of the change in slope on the second heating run.

Raman spectra were obtained with a Renishaw in Via Raman microscope with helium-neon (HeNe) laser excitation wavelength of 633 nm. Ultra violet-visible-near infrared (UV-vis-NIR) absorption spectra of the nanotube solutions were recorded on a Varian Cary 5000 UV-vis-NIR spectrophotometer.

Optical microscopy characterization of SWNT-(0.2 wt %)/R and SWNT(0.2 wt %)/PI-BDA/R composites was carried out on an Olympus SZX12 microscope at a magnification of 144x.

Transmission electron microscopy (TEM) measurements were carried out on a JEOL 2100F high-resolution scanning electron microscope operating at 200 kV. Pristine or PI-BDA functionalized SWNTs dispersed in DMF was diluted and drop cast onto a carbon-coated copper grid followed by solvent evaporation under vacuum at 50° C.

The dispersion of SWNTs in composite fibers was examined with a JEOL JSM-6700F field-emission scanning electron microscope (FE-SEM). Uncured SWNT(1 wt %)/R and SWNT(1 wt %)/PI-BDA/R spun fibers were redispersed in DMF with only mild shaking followed by filtration through a 0.2-μm alumina ($Al_2O_3$) membrane and washing several times with large quantities of DMF to remove any free polymer. These samples were coated with gold via sputtering in order to suppress surface charging effects and examined with FE-SEM. The fracture surfaces of composites after tensile testing were also coated with gold for FE-SEM observation.

Tensile properties of neat CE-EP and composite fibers were determined using an Instron model 5543 mechanical tester at room temperature. Fibers were mounted on paper frames with commercial super glue. The gauge length was 25 mm and the diameter was estimated by optical microscopy (Olympus SZX12). A 100 N load cell and a cross head speed of 2.54 mm/min were used to do the testing. At least 5 samples were tested and the results were averaged.

Example 13

Synthesis and Characterization of PI and PI-BDA

As outlined in Example 2, hydroxyl polyimide (PI) was synthesized via polycondensation of stoichiometric amounts of diamine (HAB) and dianhydride monomers (ODPA). The pendant hydroxyl groups on the PI backbone increase its solubility and provide reactive sites for grafting of side chains. Bisphenol A diglyceryl acrylate (BDA) side chains were covalently grafted to the PI backbone by reaction between the pendant hydroxyl groups on PI and epoxy groups on GAB (Example 3). DMAP was added as the catalyst and BHT was added to prevent homopolymerization of acrylate double bond on the BDA side chain. After grafting of the BDA side chains, PI-BDA dissolved well in polar solvents, such as DMF, DMAc, DMSO and NMP The structures of the synthesized PI and PI-BDA were confirmed by $^1$H NMR spectroscopy. The complete assignment of the proton signals is shown in FIG. 6. In the $^1$H NMR spectrum of PI (FIG. 6A), characteristic peaks of the phenolic —OH and aromatic protons are shown at δ 10.1 (a) and 7.1-8.2 (b-g) ppm, respectively. In the $^1$H NMR spectrum of PI-BDA (FIG. 6B), the phenolic OH signals completely disappeared while the aromatic protons of the PI backbone appeared at δ 7.0-8.2 ppm (b-g). New peaks at δ 6.7 ppm (k) and δ 7.0 ppm (l) are attributed to the aromatic protons of the grafted BDA side chain. The peaks at δ 5.8 (s, $CH_2$), 6.1 (q, CH), 6.2 ppm (r, $CH_2$) are attributed to the —OCOCH=$CH_2$ terminal group. The peak at δ 1.5 ppm (m) is attributed to —$CH_3$ groups, while the peaks at δ 3.0-4.5 ppm are assigned to the aliphatic protons of —OCH (i and o) and —$OCH_2$ (h, j, n and p) in BDA side chain. The complete disappearance of the peak at δ 10.1 ppm (a) and the appearance of new resonance peaks (h-s) confirm that BDA is 100% grafted on every pendant —OH of PI-BDA. The molecular weights ($M_n$) of polyamic acid (PAA) and PI-BDA were measured by gel permeation chromatography (GPC). PI-BDA has a higher molecular weight ($M_n$=3.9×10$^4$ g/mol) compared to PAA ($M_n$=2.7×10$^4$ g/mol). The polydispersity indices of PAA and PI-BDA measured were 1.38 and 1.35, respectively.

Example 14

Solubility of PI-BDA Functionalized SWNTs

The dispersion stability of SWNT solutions prepared in DMF with and without PI-BDA was evaluated by visual observation at different standing times after sonication. Pristine SWNTs and SWNT/PI-BDA solutions with SWNT concentration of 1 mg/mL were prepared. To clearly observe whether there are SWNT aggregates in the solution, parts of these two solutions were also diluted by 50 times to afford solutions with low nanotube concentration (0.02 mg/mL). All these solutions (before and after dilution) were left standing for different times (immediately, 7 days, and 6 months) and the homogeneity was evaluated by visual observation.

Figure 7:
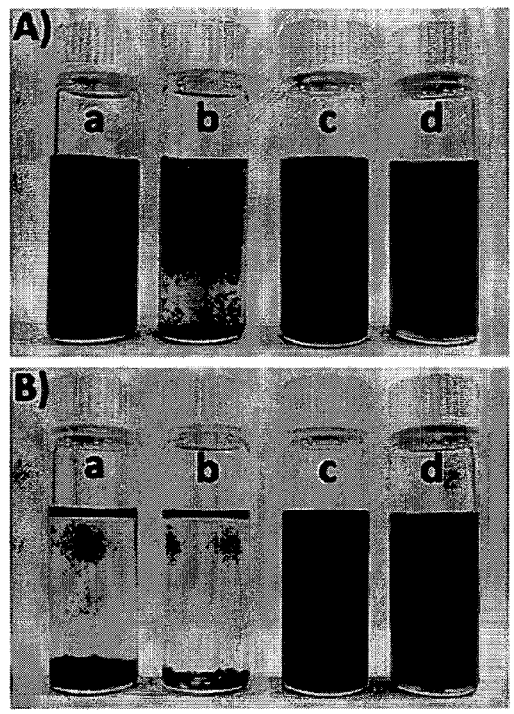
FIG. 7 are photographs showing (a and b) pristine SWNT and (c and d) SWNTs/PI-BDA in DMF at different standing times after sonication: (A) immediately; (B) 7 days. The SWNT concentration of a and c is 1 mg/mL and of b and d is 0.02 mg/mL.

FIG. 7 are photographs showing (A) immediately, (B) 7 days of pristine SWNT (Samples a and b) and SWNTs/PI-BDA (Samples c and d) in DMF at different standing times after sonication. The SWNT concentration of Samples a and c is 1 mg/mL, and Samples b and d is 0.02 mg/mL. Suspended nanotube aggregates can be clearly seen in pristine SWNT solution (FIG. 7A, vial b), whereas the diluted SWNT/PI-BDA solution appears free from SWNT aggregates (FIG. 7A, vial d). After 7 days, pristine SWNTs completely settled at the bottom of the vials (FIG. 7B, vials a and b). The SWNT/PI-BDA solutions were very stable and did not precipitate after 7 days (FIG. 7B, vials c and d), or even after six months of standing at room temperature. These phenomena indicate that PI-BDA significantly improves the solubility of SWNTs in DMF and provides long-term dispersion stability.

Figure 8:
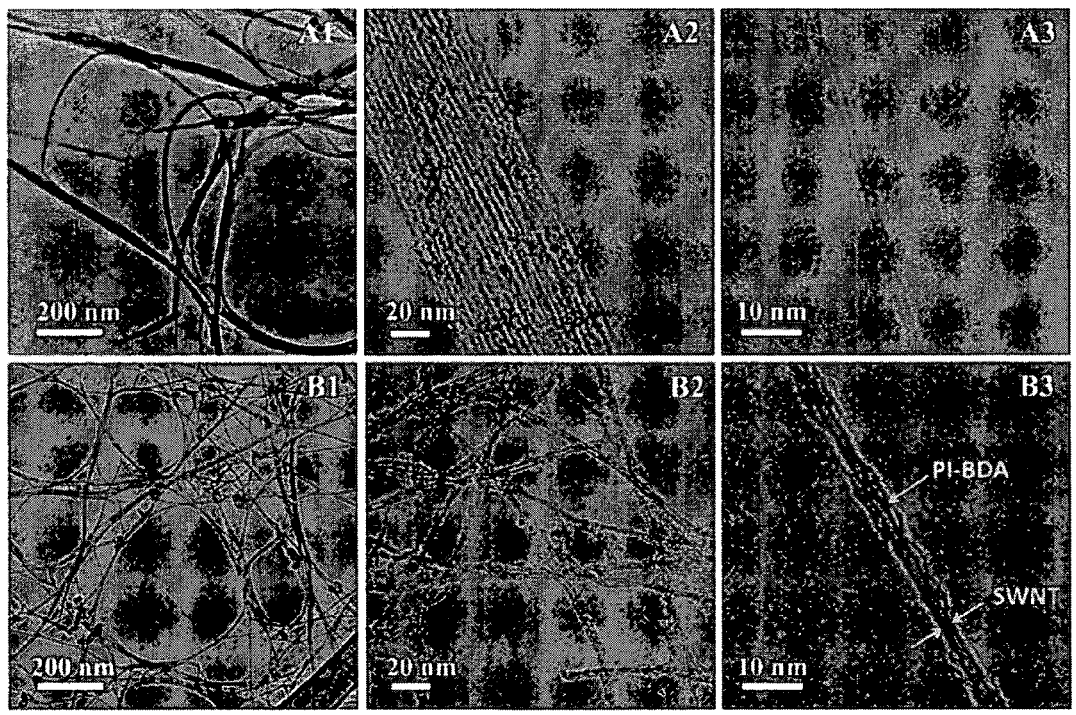
FIG. 8 are TEM images of (A1-A3) pristine SWNTs and (B1-B3) PI-BDA functionalized SWNTs.

The dispersion of pristine SWNTs and PI-BDA functionalized SWNTs in DMF was also examined by TEM (FIG. 8). As shown in FIGS. 8A1 and A2, pristine SWNTs are highly entangled with each other and the bundle size (about 30 nm or larger) is not uniform. FIG. 8A3 reveals that the SWNT surface is very clean.

Figure 9:
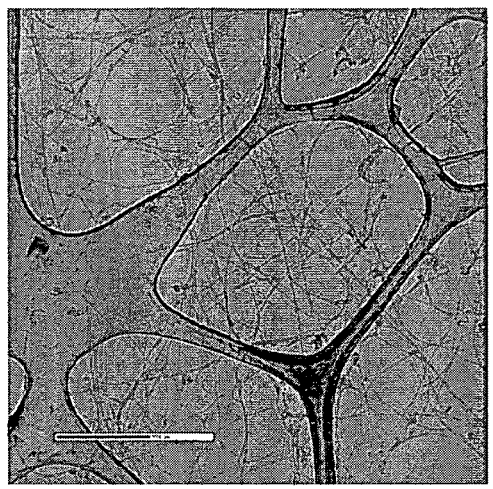
FIG. 9 is a TEM image of PI-BDA functionalized SWNTs (mass ratio 1:1) which shows that nanotube length is not significantly reduced. The scale bar is 500 nm.

After functionalization with PI-BDA, the bundle size becomes much smaller (FIG. 8B1), and most of the SWNTs appear to be dispersed as individual tubes or very small bundles (FIG. 8B2). A higher resolution TEM image (FIG. 8B3) reveals clearly that the SWNTs are covered with a layer of coating, which is believed to be PI-BDA wrapped on the SWNT surface. It should be noted that the thickness of the PI-BDA layer is not uniform. A lower magnification TEM image as shown in FIG. 9 shows that the SWNT length (at least 1-2 μm) is not significantly reduced after noncovalent functionalization with PI-BDA, which is different from the observation of chopped CNTs (length usually less than 1 μm) after covalent modification.

Figure 10:
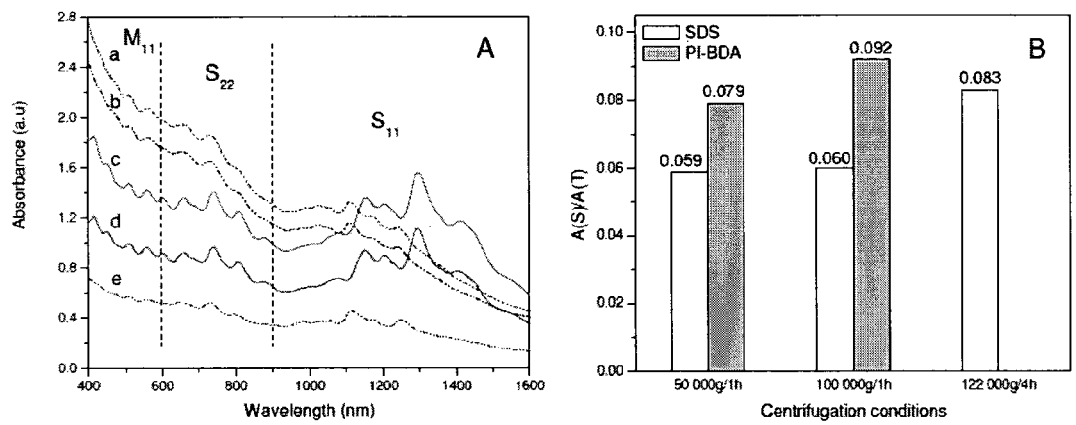
FIG. 10(A) is a UV-vis-NIR spectra of HiPCO SWNTs solutions dispersed with SDS in $D_2O$ (a, b and e) and with PI-BDA in DMF (c and d) after centrifugation at 50 000 g for 1 hour (a and c), at 100 000 g for 1 hour (b and d) or at 122 000 g for 4 hours (e).
FIG. 10(B) is a graph showing the A(S)/A(T) ratio of the dispersed SWNTs solutions calculated from the spectra in (A).

The high efficacy of PI-BDA at dispersing SWNTs into individual nanotubes or small bundles was also verified by UV-vis-NIR as shown in FIG. 10. FIG. 10A shows absorbance spectra of HiPCO/SDS/D$_2$O and HiPCO/PI-BDA/DMF solutions after centrifugation at different conditions. The calculated resonance ratio A(S)/A(T) of these spectra, where A(S) is the area of the S$_{22}$ spectral band after linear baseline subtraction due to dispersed SWNTs and A(T) is the total area under the spectral curve due to total carbonaceous contents, are plotted in FIG. 10B.

It is known that when there are more individual nanotubes suspended in the dispersion, the UV-vis-NIR peaks become sharper and the A(S)/A(T) ratio increases. Under the same centrifugation conditions (50,000 g or 100,000 g for 1 h), the absorption intensity of the SDS-dispersed solution is higher than that dispersed with PI-BDA, but the peaks in the spectra of HiPCO/PI-BDA are much more distinct than those of HiPCO/SDS as reflected by the higher A(s)/A(T) ratio with dispersant, confirming that PI-BDA better disperses the nanotubes than SDS. It is known that DMF is one the most efficient solvents for dispersing SWNTs. However, no absorbance peak was observed in the HiPCO/DMF (without PI-BDA) solution after centrifugation at 50 000 g for 1 h (data not shown), indicating no SWNTs in the solution. Thus, the good dispersion of SWNTs using PI-BDA/DMF can be mainly ascribed to PI-BDA. The HiPCO/SDS was also centrifuged at the optimal condition (122,000 g for 4 h); the absorption intensity was lower than that of HiPCO/PI-BDA but the A(s)/A(T) ratio increased to 0.083, indicating fewer suspended carbonaceous impurities at this higher centrifugation speed so that the ratio of individually suspended SWNTs to total suspended carbonaceous contents increased. However, the A(S)/A(T) of HiPCO/PI-BDA with 100,000 g/1 h (0.092) was still higher than that with SDS at optimal condition (0.083) and the peaks were more distinct. All these results confirm that PI-BDA is more effective than SDS, a standard surfactant, at dispersing SWNTs. It is postulated that the high efficiency of PI-BDA at dispersing SWNTs is attributed to its comb-like structure, where the PI backbone has strong π-π interaction with SWNTs wall and the BDA graft imparts strong repulsive forces to SWNTs via steric hindrance.

The efficacy of PI-BDA at dispersing SWNTs was quantitatively evaluated through absorption spectra measurement and Beer-Lambert law (A=∈lc), where A is the absorbance at a particular wavelength (500 nm was chosen), ∈ is the extinction coefficient, l is the path length (1 cm for our cell), and c is the concentration. To determine the extinction coefficient (∈), the absorbance of very dilute SWNT/PI-BDA (mass ratio 1:1) solution at different concentrations was measured.

Figure 11:
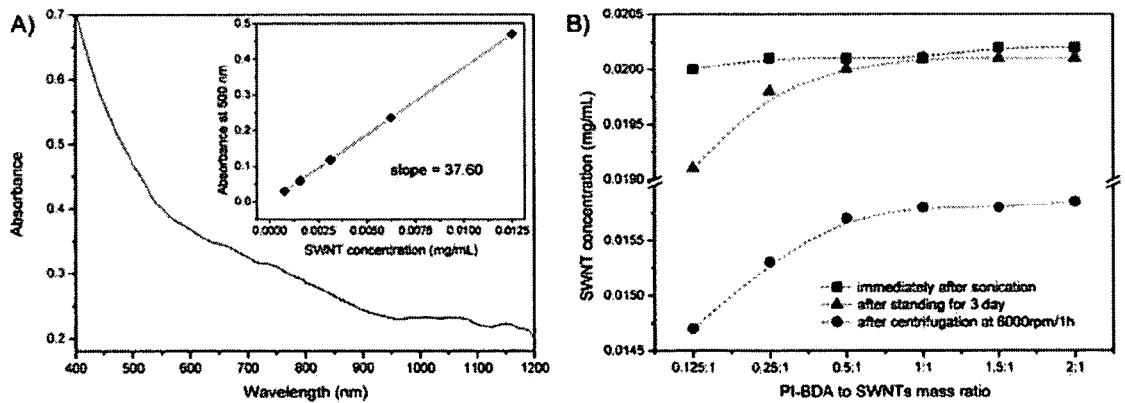
FIG. 11(A) is a graph showing absorption spectrum of SWNTs/PI-BDA (mass ratio 1:1) at a concentration of 0.0125 mg/mL in DMF. Inset shows absorbance at 500 nm of the SWNTs/PI-BDA (1:1) in DMF at different concentrations. The straight line is a linear-least-squares fit to the data.
FIG. 11(B) is a graph showing SWNT concentrations of solutions prepared using different PI-BDA to SWNT mass ratio in different conditions: immediately after sonication; after standing for 3 days, and after centrifugation at 6000 rpm for 1 hour.

FIG. 11 shows a representative curve and the absorbance at 500 nm plotted against SWNT concentrations (inset in FIG. 11A). The linear-least-squares fit to the data gave a slope of 37.60, which was used to calculate the extinction coefficient (i.e., ∈=37.60 mL mg$^{-1}$ cm$^{-1}$) for determination of SWNT concentration. FIG. 11B shows the extracted SWNT concentrations of SWNT/PI-BDA dispersions prepared using different PI-BDA to SWNT mass ratio from 0.125:1 to 2:1 in different conditions: (1) immediately after sonication; (2) after standing for 3 days, and (3) after centrifugation at 6000 rpm for 1 hour.

Immediately after sonication, all the dispersions have suspended SWNT concentrations of about 0.02 mg/mL for ease of comparison among various PI-BDA to SWNT ratios. After standing for 3 days or centrifugation at 6000 rpm for 1 hour, there is a clear dependence of the PI-BDA to SWNTs mass ratio on the amount of dispersed SWNTs. The SWNT concentration increases first but levels off when the PI-BDA to SWNTs mass ratio reaches 1:1, suggesting that 1:1 is the optimal mass ratio for preparing SWNT/PI-BDA dispersion. The SWNT concentration of SWNT/PI-BDA (mass ratio 1:1) after centrifugation is about 0.0158 mg/mL, which is higher than that of polyvinylpyrrolidone (PVP, M$_w$=29 000, Sigma-Aldrich) dispersed SWNTs prepared by the same method (0.0105 mg/mL), indicating higher efficacy of PI-BDA at dispersing SWNTs than the commercial dispersant PVP.

Example 15

SWNT Dispersion and Interfacial Bonding in Composites

Figure 12:
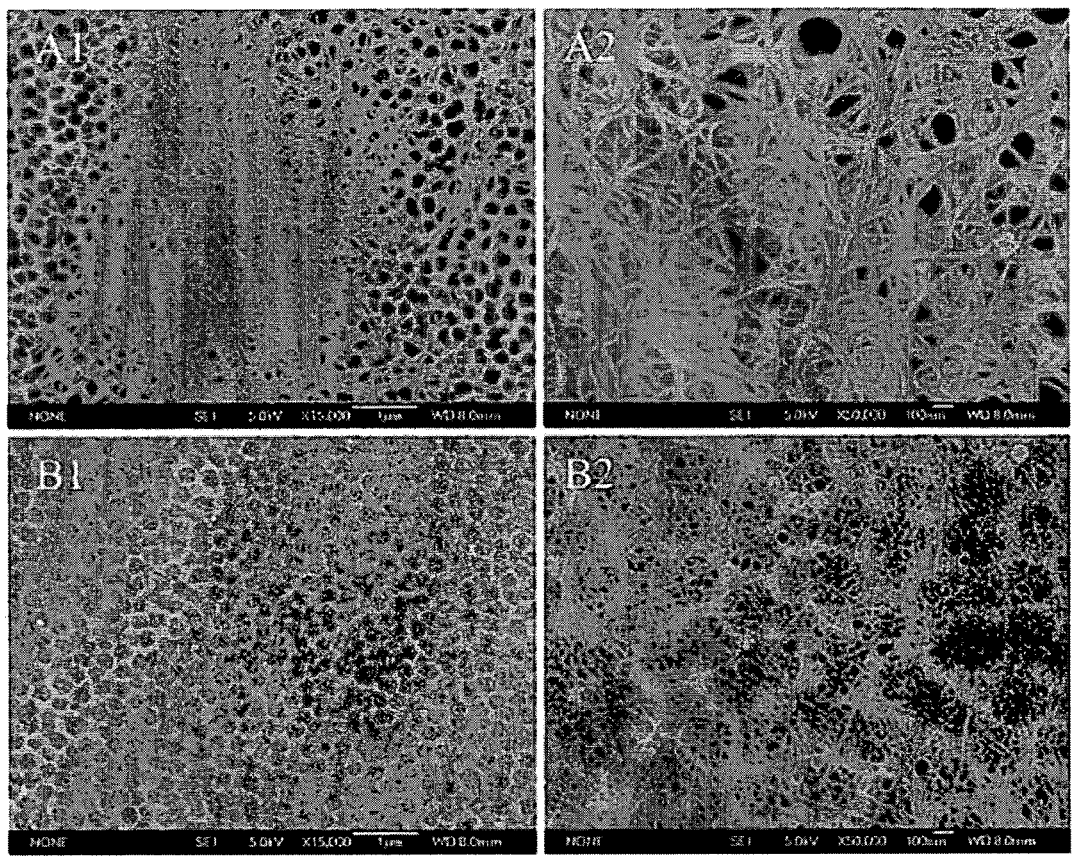
FIG. 12 are FE-SEM images of SWNTs in uncured SWNT (1 wt %)/R and SWNT (1 wt %)/PI-BDA/R spun fibers after removal of free polymer on a 0.2-μm alumina ($Al_2O_3$) membrane.

FIG. 12 shows the FE-SEM images of SWNTs in uncured SWNT (1 wt %)/R and SWNT (1 wt %)/PI-BDA/R spun fibers after removal of free polymer on a 0.2-μm alumina (Al$_2$O$_3$) membrane. Pristine SWNTs form large aggregates (FIG. 12A1) while PI-BDA functionalized SWNTs are homogeneously dispersed (FIG. 12B1). Higher magnification images reveal that SWNTs in SWNT/PI-BDA were debundled very well and the nanotube bundle size (FIG. 12B2) is much smaller than that of pristine SWNTs (FIG. 12A2). These observations are consistent with the dispersion state of pristine and PI-BDA functionalized SWNTs in the fully cured composite fibers that will be discussed below.

Figure 13:
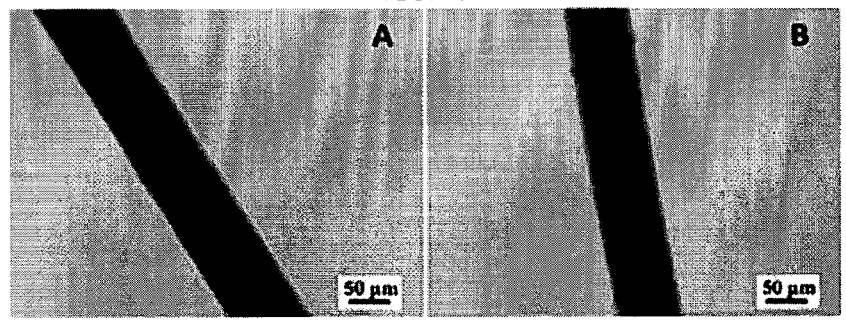
FIG. 13 are optical micrographs of (A) SWNT(0.2 wt %)/R and (B) SWNT (0.2 wt %)/PI-BDA/R composite fibers after post curing.

FIG. 13 shows optical micrographs of fully cured SWNT/R and SWNT/PI-BDA/R composite fibers with SWNT loading of 0.2 wt %. (Composites with higher SWNT loadings are opaque.) Many black spots with sizes up to 10 μm can be clearly seen in the SWNT (0.2 wt %)/R fiber (FIG. 13A), indicating non-uniform dispersion of SWNTs. In contrast, SWNT (0.2 wt %)/PI-BDA/R shows homogeneous dispersion of SWNTs throughout the matrix, and no obvious aggregates were observed (FIG. 13B).

Figure 14:
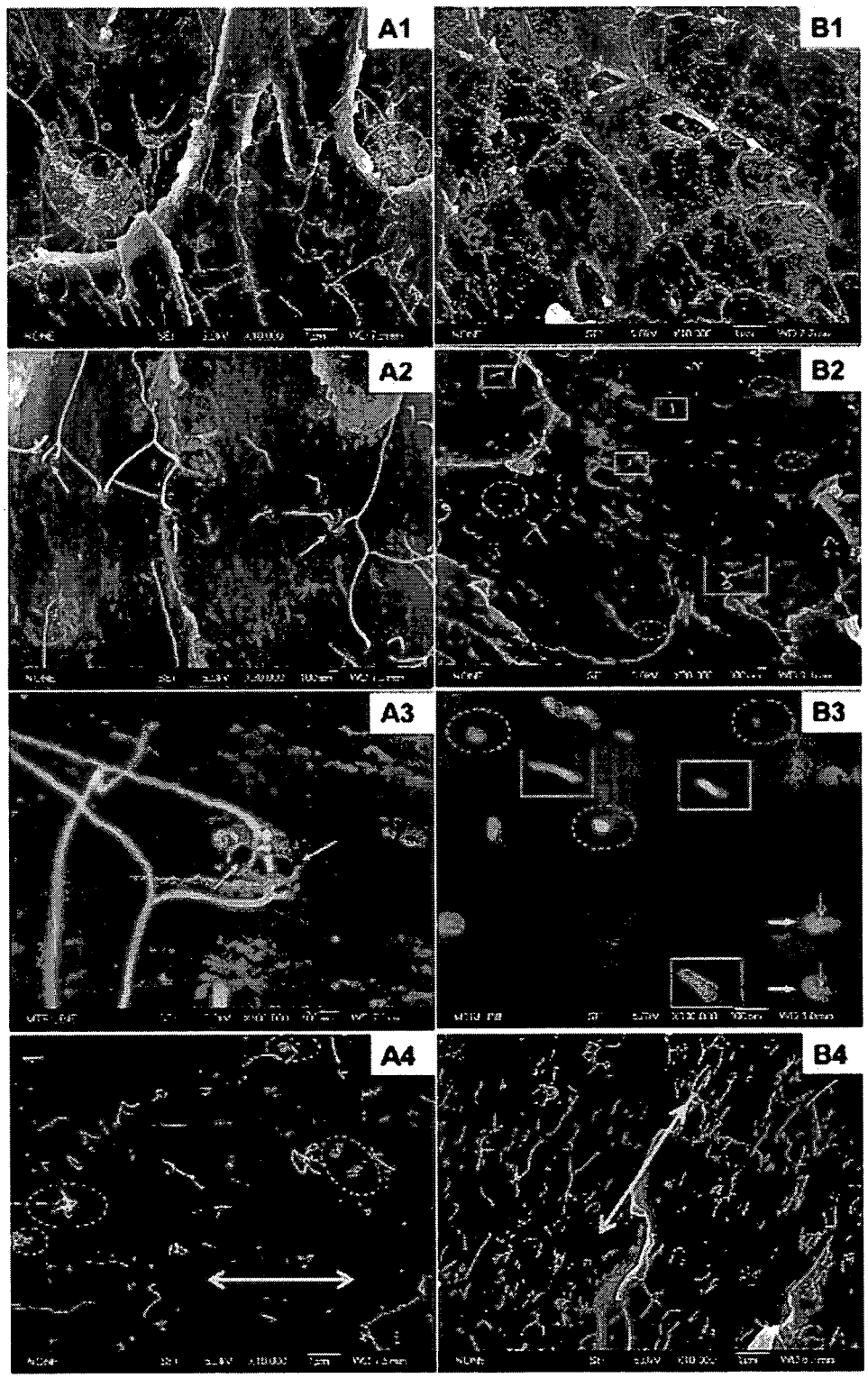
FIG. 14 are FE-SEM images of (A1-A4) SWNTs (1 wt %)/R and (B1-B4) SWNTs (1 wt %)/PI-BDA/R composite fibers: the cured fibers after tensile testing in cross-sectional direction (A1-A3, B1-B3) and the spun fibers in longitudinal direction (A4 and B4). The arrows in A4 and B4 show the direction of fiber axis.

To further evaluate the dispersion and morphology of SWNTs in composite fibers, cross sections of SWNT-(1 wt %)/R and SWNT(1 wt %)/PI-BDA/R composite fibers after tensile testing were examined with FE-SEM (FIG. 14). In SWNT (1 wt %)/R composite fibers, aggregates with sizes of about 1 μm can be clearly seen, indicating non-uniform dispersion (FIG. 14A1, circled). Many SWNTs are pulled out, leaving holes on the surface (FIGS. 14A2 and A3, arrows), indicating weak interfacial adhesion between the SWNTs and the CE-EP matrix. In contrast, PI-BDA functionalized SWNTs are homogeneously distributed in the CE-EP matrix without any large aggregates (FIG. 14B1). Some nanotubes seem to have partially pulled out from the surface but the pull-out length of the SWNTs is significantly reduced (indicated by squares in FIGS. 14B2 and B3) compared with the nanotubes in SWNTs/R; other nanotubes are broken on the surface and the ends are tightly embedded in the matrix (indicated by circles in FIGS. 14B2 and B3). These FE-SEM images suggest that the nanotube/matrix interface between PI-BDA functionalized SWNTs and the CE-EP matrix is stronger than that in SWNT/R composite. The strong interfacial bonding can be ascribed to two effects: (i) strong π-π interaction between nanotube and the backbone of PI-BDA and (ii) the compatibility and covalent reaction between the BDA side chain and the matrix.

Figure 15:
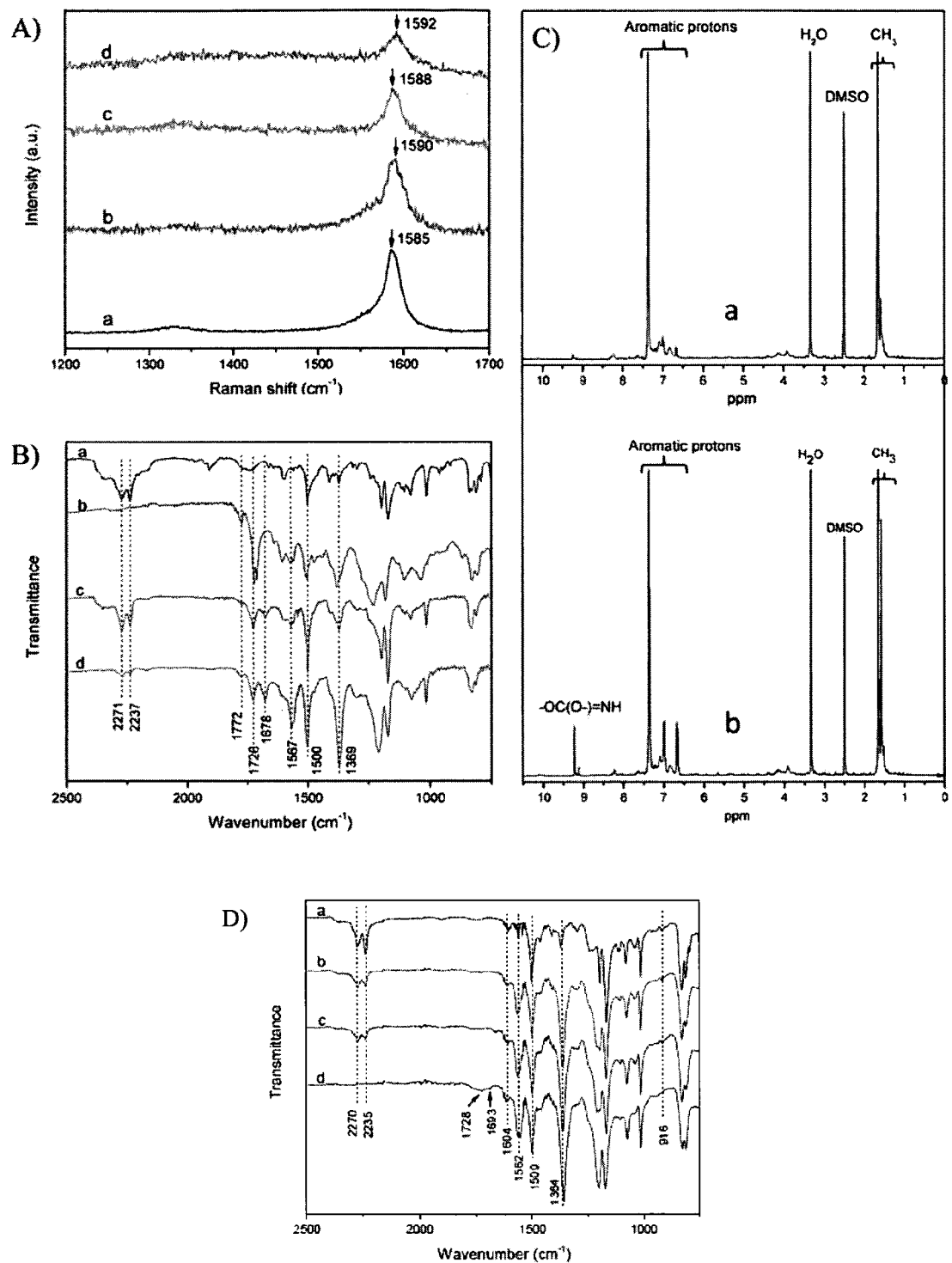
FIG. 15 are graphs showing (A) Raman spectra of (a) pristine SWNTs, (b) SWNTs/PI-BDA, (c) SWNT(1 wt %)/R composites, and (d) SWNT (1 wt %)/PI-BDA/R composites. (B) FT-IR spectra of (a) neat CE before curing, (b) PI-BDA, (c and d) PI-BDA/CE (30/70, w/w) (c) before and (d) after heating at 120° C. for 1 hour. (C) 1H NMR spectra of PI-BDA/CE (30/70, w/w) in DMSO-d6 (a) before and (b) after heating 120° C. for 1 hour. (D) FTIR spectra of (a) neat CE-EP mixture before curing, and (b-d) SWNTs(1 wt %)/PI-BDA/CE-EP spun fibers (b) before UV pre-curing, (c) after UV pre-curing, and (d) after post curing.

The π-π interaction between SWNTs and the backbone of PI-BDA was verified by Raman spectra. FIG. 15A shows Raman spectra of (a) pristine SWNTs, (b) SWNTs/PI-BDA, (c) SWNT(1 wt %)/R fibers, and (d) SWNT-(1 wt %)/PI-BDA/R fibers. It is known that covalent functionalization can introduce defects into CNTs, leading to increased intensity of D-band (at about 1330 cm$^{-1}$). Unlike covalent functionalization, no significant increase in the peak intensity of D-band was observed in SWNTs/PI-BDA (b) and SWNT(1 wt %)/PI-BDA/R (d), indicating that the nanotube graphene structure was well preserved after non-covalent functionalization with PI-BDA. Comparing the G-band of SWNTs/PI-BDA (b), SWNTs-(1 wt %)/R (c), and SWNTs(1 wt %)/PI-BDA/R (d) to the pristine SWNTs sample (a), upshifts of about 5, 3, and 7 cm$^{-1}$, respectively, were observed. The 3 cm$^{-1}$ upshift in SWNTs (1 wt %)/R (c) compared to pristine SWNTs (a), and the 2 cm-1 higher upshift in SWNTs (1 wt %)/PI-BDA/R (d) compared to SWNTs/PI-BDA (b) can be attributed to the π-stacking of CE-EP resin molecules on the nanotubes. The 4-5 cm$^{-1}$ Raman upshifts due to the PI-BDA (comparing d to c, and b to a) indicate that the electronic environment of the SWNT surface has changed after functionalization with PI-BDA, with or without CEEP matrix. This is believed to be due to the strong π-π interaction between highly conjugated SWNT wall and PIBDA backbone with high content of aromatic rings.

The BDA side chains also contribute to the good interfacial adhesion between SWNTs/PI-BDA and CE-EP matrix. The BDA side chain contains bisphenol A moiety like those in the cyanate ester and epoxy resins, which increases the compatibility and miscibility between SWNTs/PI-BDA and CE-EP matrix. Moreover, the —OH groups on BDA side chains can react with —OCN group of CE to form iminocarbonate (—OC(O-)dNH) bonds (FIG. 16B). The formation of iminocarbonate was confirmed with FT-IR and NMR.

To increase detectability of the reaction between PI-BDA and CE, a blend containing larger proportions of PI-BDA to CE (30/70, w/w) was heated and analyzed with FT-IR and $^1$H NMR. FIG. 15B shows the FT-IR spectra of (a) neat CE before curing, (b) PI-BDA, and PIBDA/CE (30/70, w/w) (c) before and (d) after heating at 120° C. for 1 hour. In spectrum 15B(c), the band at 1678 cm$^{-1}$, attributed to the formation of new —OC(O—)═NH bands, is present but small as the sample was heated to 80° C. (for DMF removal after casting). After further heating at 120° C. for 1 hour (spectrum 15B(d)), the relative intensity of —OC(O-)dNH band (1678 cm$^{-1}$) increased, suggesting the reaction of more —OH groups with —OCN. The increased intensities of the bands at 1369 and 1567 cm$^{-1}$ imply the formation of some triazine structures. A control experiment was also performed in which pure CE without PI-BDA was used, and there was no difference in the FT-IR spectra of the pure CE treated at 80° C./2 hour and 120° C./1 hour.

The reaction between PI-BDA and CE was also confirmed by $^1$H NMR spectra. FIG. 15C shows the $^1$H NMR spectra of PI-BDA/CE (30/70, w/w) mixture in DMSO-d$_6$ before and after heating at 120° C. for 1 h. After heating at 120° C. for 1 h (spectrum 22C(b)), the intensity of the peaks at around 9.2 ppm resulting from the NH protons of —OC(O—)═NH groups significantly increased. Additional evidence of reaction is that the —CH$_3$ peaks (at δ around 1.6 ppm) and aromatic peaks (at δ 6.7-7.2 ppm) of CE (overlapped with the peaks due to —CH$_3$ and aromatic protons in PI-BDA, respectively) split into two or more peaks, which can be attributed to unconsumed CE, and adducts between PI-BDA and CE (or triazine oligomer) (FIG. 16B). All these confirm that —OCN groups on CE matrix covalently react with —OH groups on PI-BDA dispersant to form —OC(O—)═NH bonds.

Example 16

Mechanical Properties

Figure 19:
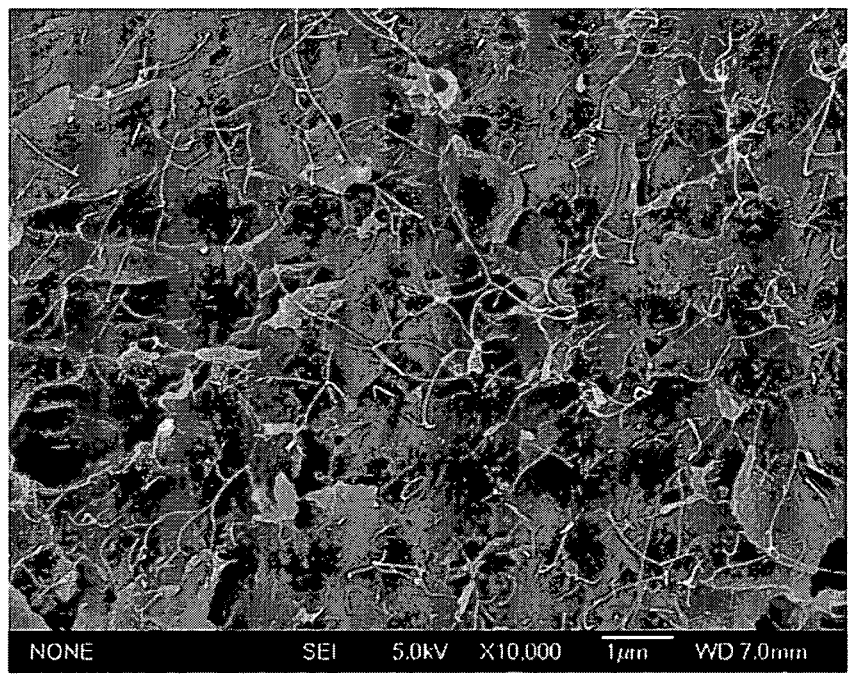
FIG. 19 is a FE-SEM image of cross-sectional fracture surface of the SWNT(1.5 wt %)/PI-BDA/R composite.

The tensile properties for neat CE-EP, SWNT/R, and SWNT/PI-BDA/R composites with different nanotube loadings are summarized in the table in FIG. 17 and FIG. 18. Representative tensile stress versus strain curves are shown in FIG. 18A. Without adding PI-BDA dispersant, SWNTs/R composites show limited increases in tensile properties. The highest increase in tensile modulus (E) is 33% (from 2.61±0.14 to 3.47±0.18 GPa) at SWNT loading of 1 wt %, and the highest increase in tensile strength (σ) is 28% (from 83.7±3.3 to 107.0±11.0 MPa) at SWNT loading of 0.5 wt %. Further increase in SWNT content impairs tensile properties. The elongation at break (∈) decreases continuously from 5.0±0.4 to 2.5±0.4% as SWNT loading increases from 0 to 1.5 wt %, and the toughness (T) has no significant improvement. With SWNTs dispersed by PI-BDA, increasing nanotube content from 0 to 1 wt % leads to a continuous increase in both tensile modulus and strength. For SWNT (1 wt %)/PI-BDA/R composite, the tensile modulus and strength increased by 80% and 70%, respectively, from 2.61±0.14 to 4.70±0.24 GPa and 83.7±3.3 to 142.3±6.9 MPa (relative to neat CE-EP resin). 1.5 wt % SWNTs/PI-BDA resulted in decreased tensile modulus and strength, which can be attributed to the poor wetting of SWNTs as reflected from more pulled-out SWNTs on the fracture surface of the SWNT(1.5 wt %)/PI-BDA/R composite (FIG. 19). Others have calculated that 1 vol % (about 1 wt %) of SWNTs is sufficient to ensure that all of the polymer molecules are within one radius of gyration (5 nm) of a nanotube, implying difficulties in complete wetting of high loading (>1 wt %) of SWNTs. This theoretical estimate is consistent with our observation. The elongation at break of SWNT/PI-BDA/R composite increases initially at SWNT loading of 0.2 wt % (from 5.0±0.4 to 6.2±0.7%) and then decreases gradually to 3.7±0.4% for the 1.5 wt % composite.

All the SWNT/PI-BDA/R composites with SWNT loading ranging from 0.2 to 1.5 wt % show higher toughness than neat CE-EP resin. Increases of 100% and 58% in toughness are achieved at SWNT loading of 0.2 wt % and 1 wt %, respectively. As manifested in the FE-SEM fractograph of the SWNT (1 wt %)/PI-BDA/R composite (FIG. 14B1), well-dispersed SWNTs and strong SWNT matrix bonding effectively resist the propagation of cracks during deformation, thus increasing the fracture toughness. The poor reinforcement effect of SWNTs without dispersant is possibly due to the aggregation of nanotubes in the matrix and weak interfacial bonding as discussed previously. This is corroborated by greater improvements of the tensile modulus, strength, and toughness of the composites with the PI-BDA dispersant.

Using only 1 wt % PI-BDA functionalized SWNTs, the absolute tensile properties of SWNT (1 wt %)/PI-BDA/R composites (E=4.70±0.24 GPa and σ=142.3±6.9 MPa) are higher than those of most other CNT reinforced thermoplastics and thermosets, including CNT/CE and CNT/epoxy thermosetting composites. Because there is no work about CNTs reinforced CE-EP composite, the comparison is made with that of solution-processed CNTs reinforced epoxy (a typical thermosetting matrix) composites. The detailed comparison is summarized in the table in FIG. 20. It should be noted that the comparisons are only approximate as the nanotubes used, matrices, processing technique (e.g., solution mixing versus direct mixing), etc., which are listed in FIG. 20 differ. Nanotubes used could be single-walled, double-walled, or multi-walled. From FIG. 20, we can see that most tensile properties are reported for low CNT contents (about 1 wt %) as the mechanical properties usually deteriorate with higher loadings. While the epoxy resins used differ chemically, most have strength ($\sigma$) and modulus (E) of about 60-90 MPa and 2-3 GPa, respectively. The reported nanotube dispersion methods for the tabulated composites involve covalent functionalizations.

Our absolute values and percent increases for both tensile strength and modulus achieved with 1 wt % of SWNTs/PI-BDA (E=4.70±0.24 GPa (80% increase) and $\sigma$=142.3 (6.9 MPa±70% increase)) are higher than the tabulated increases for E and $\sigma$ which are usually less than 30-40%. The tensile reinforcement, efficacy can also be quantitatively evaluated by calculating the Young's modulus and tensile strength per unit weight fraction ($dE/dW_{NT}$ and $d\sigma/dW_{NT}$). In this study, $dE/dW_{NT}$ and $d\sigma/dW_{NT}$ reach to 252 GPa and 8120 MPa, respectively, at 0.5 wt % of SWNTs and to 209 GPa and 5860 MPa at 1 wt % of SWNTs. These values are also superior compared to the results of CNT/epoxy composites reported in literature (FIG. 20). The significant mechanical enhancements achieved here can be attributed to the (i) high aspect ratio of SWNTs with well-preserved graphene structure surface due to non-covalent functionalization; (ii) homogeneous dispersion of SWNTs/PI-BDA in CE-EP matrix; and (iii) strong $\pi$-$\pi$ interaction between SWNTs and the backbone of PI-BDA, and covalent reaction between PI-BDA dispersant and the CE-EP matrix.

The tensile strength of CE-EP composites reinforced with SWNTs can be predicted by a standard model for composite reinforced with short aligned fibers:

$$\sigma_C = \left(1 - \frac{\sigma_f r}{2 l_f \tau}\right) \sigma_f V_f + \sigma_m (1 - V_f)$$

where $\sigma_C$, $\sigma_f$, and $\sigma_P$ are the composite, the nanotube, and the polymer matrix strengths, respectively; r is average SWNT radius; $l_f$ is average SWNT length; $V_f$ is the SWNT volume fraction (estimated from the SWNT mass fraction, the SWNT density (1.5 g cm$^{-3}$), and the matrix density (1.2 g cm$^{-3}$)); and $\tau$ is the nanotube-matrix interfacial shear strength. Based on the values $\sigma_f$=30 GPa, $\sigma_m$=83.7 MPa, r=5 nm, $l_f$=5 µm, and $\tau$=150 MPa, the theoretical tensile strengths of composites with SWNTs loading of 0.2, 0.5, 1.0, and 1.5 wt % are 129, 197, 311, and 425 MPa, respectively. By comparing with the respective measured strength values of 120.1±2.7, 124.3±2.2, 142.3±6.9, and 124.8±9.6 MPa, the measured strength is very close to the calculated value only for SWNT (0.2 wt %)/PI-BDA/R. The measured strength values diverge from the calculated data as the SWNT loading increases beyond 0.2 wt %, which could be due to limited alignment of SWNTs in the composite fiber, relatively weak interaction between SWNTs and PI-BDA, inevitable SWNT bundling, fiber defect, and so on. It is believed that the adhesion of the matrix to the nanotube at high nanotube loading is relatively poor with this dispersant since the interaction is non-covalent. These negative influences become severe at high SWNT loadings.

To make better improvements in the mechanical properties with nanotube, especially at high loading of the latter, several criteria need to be simultaneously achieved: good nanotube wetting and dispersion, low nanotube defect, nanotube alignment, and good stress transfer to the matrix. It appears that for multiwalled carbon nanotubes with diameters of about 10 nm, the theoretical limit of nanotube content for good wetting is around 30 wt %. Ensuring good stress transfer to the atomically smooth nanotube surface may be another major challenge that needs to be overcome. Also, it will be ideal to have a matrix that is also nanotube-dispersing without involving a dispersant or surfactant that is different from the matrix as the compatibility of the matrix and dispersant/surfactant is usually poor. We are exploring some of these factors in trying to improve the properties of nanotube-reinforced composites.

Example 17

Thermal Properties

With addition of the PI-BDA dispersant, the thermal properties (specifically glass transition temperature ($T_g$) and decomposition temperature ($T_d$)) of the SWNT/PI-BDA/R composites were improved compared with SWNT/R composites or neat resin (FIG. 1).

Figure 21:
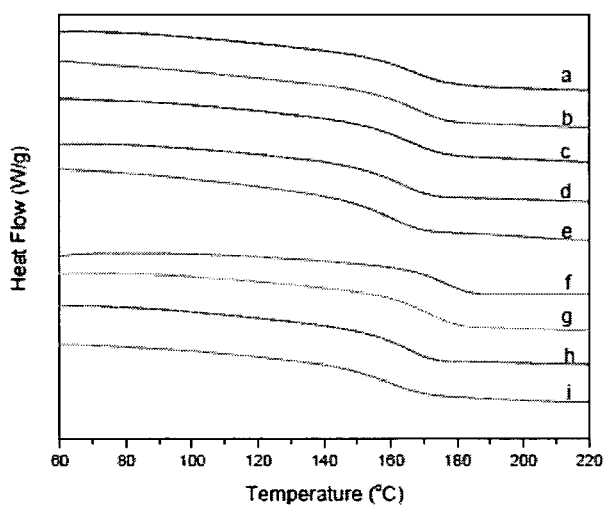
FIG. 21 is a graph showing comparison of $T_g$ values for (a) neat CE-EP fiber, (b-e) SWNTs/R and (f-i) SWNTs/PI-BDA/R composite fibers with various SWNT loadings: 0.2 wt % (b and f), 0.5 wt % (c and g), 1 wt % (d and h), 1.5 wt % (e and i).

The $T_g$ values of neat CE-EP and SWNTs reinforced composites were determined from DSC scans, shown in FIG. 21 and listed in the table shown in FIG. 17. The glass transition temperature of neat CE-EP is 167° C. For SWNTs/R composite fibers (b-e), as the SWNTs loading increases from 0.2 to 1.5 wt %, the $T_g$ decreases continuously. With SWNTs/PI-BDA/R composites (f-i), the $T_g$ value increases to 175° C. with 0.2 wt % SWNTs/PI-BDA and then decreases continuously beyond that to 160° C. with 1.5 wt % SWNTs/PI-BDA. The increased $T_g$ in SWNTs/PI-BDA/R composites over neat CE-EP can be ascribed to the good nanotube dispersion and the reaction between PI-BDA and CE, which restricts the mobility of CE-EP chains. The reduction in $T_g$ in SWNTs/R and SWNTs/PI-BDA/R (when CNTs loading ≥1 wt %) can be explained by two possible factors: (i) the free volume fraction increases with SWNTs loadings, which increases the segmental mobility and thus leads to decreased Tg; (ii) SWNTs may disrupt the cross-linking network of the matrix, reducing the effective cross-link density and leading to lower $T_g$. This behavior becomes more significant at high SWNTs loadings.

The decomposition temperatures (Td) at 5 wt % loss of all the samples were determined from their TGA curves and are listed in the table in FIG. 17. It was observed that the incorporation of SWNTs with and without PI-BDA can improve the thermal stability, but SWNTs/PI-BDA have a stronger effect than SWNTs. The maximum $T_d$ amongst the composites with and without PI-BDA, i.e. of SWNT(1 wt %)/PI-BDA/R and SWNTs(1.5 wt %)/R respectively, are higher by 18° C. and 13° C. compared to that of neat CE-EP resin. The improved thermal stability with addition of nanotubes is postulated to be due to a nanotube barrier effect which prevents the volatilization of polymer decomposition products, and the higher heat capacity of carbon nanotubes compared to polymer matrix. SWNTs/PI-BDA exhibit a more remarkable impact on the thermal stability of CE-EP than unfunctionalized SWNTs because of the better dispersion and interfacial reaction between the matrix and PI-BDA that restricts the segmental motion of CE-EP molecules as compared with SWNTs without dispersant.

Good nanotube dispersion and interfacial reaction between CE matrix and SWNT/PI-BDA restricts the segmental motion of CE-EP molecules, leading to increased $T_g$. The reduction in $T_g$ with further increase in CNT content may be possibly due to SWNT disruption of the cross-linking network of the matrix to reduce the effective cross-link density. The improved thermal stability with addition of nanotubes is postulated to be due to a nanotube barrier effect which retards the volatilization of polymer decomposition products, and the higher heat capacity of CNTs compared to polymer matrix.

Example 18

Preparation of PI-GNE

In a typical procedure for synthesis of PI-GNE, PI (0.588 g, 1.20 mmol of repeat unit) was dissolved in 40 mL of dry DMSO at 60° C. in a 100 mL round-bottom flask equipped with a water condenser and an argon inlet/outlet. Then DMAP (0.293 g, 2.40 mmol) was added under argon protection. After DMAP was completely dissolved, a solution of GNE (0.730 g, 2.64 mmol) in 20 mL of dry DMSO was added, and the resulting mixture was stirred at 100° C. for 48 h. After removal of some DMSO by rotary evaporation, the mixture was poured into a large amount of methanol with stirring. The precipitate was collected by filtration and washed successively with 0.2 M HCl solution, 5 wt % $NaHCO_3$ solution and DI water. Finally, the side-chain polyimide (PI-GNE) so obtained was vacuum-dried at 60° C. for 24 h. The yield was 0.778 g (62% yield). The weight-average molecular weight ($M_w$) and the polydispersity index (PDI) of PI-GNE measured from GPC based on polystyrene standards were $5.5 \times 10^4$ g/mol and 1.35.

Example 19

Preparation of SWNT/PI-GNE Dispersions

SWNT/PI-GNE dispersions were prepared by the same procedure in Example 7 by changing PI-BDA to PI-GNE.

Example 20

Alternate Procedure for Preparation of SWNT/PI/CE, SWNT/PI-BDA/CE and SWNT/PI-GNE/CE Composite Films An alternate procedure to that presented in Examples 8-10 for preparing SWNT/PI/CE composite films is as follows: 0.1 g of CE which had been pre-cured at 180° C. for 1 h was first dissolved in 0.1 mL of DMF. Then the CE solution was mixed with measured quantities of SWNT/PI dispersion prepared as above. After sonication in a sonic bath for 10 min, the solution of SWNT/PI/CE in DMF was cast onto a horizontal glass slide (26 mm×76 mm×1 mm). The slide was warmed on a hot plate at ~50° C. to slowly remove most of the DMF. Then the slide was transferred to a vacuum oven and dried under vacuum at 80° C., 100° C. and 120° C. for 2 h each. Finally, the films were cured in a convection oven. The curing cycle was 3 h at 180° C., 2 h at 200° C. and 2 h at 250° C. The thickness of the resulting film was about 40 μm, measured with a low torque digital micrometer. Neat CE films and CE composite films reinforced with SWNTs (SWNTs/CE), PI-BDA functionalized SWNTs (SWNT/PI-BDA/CE), and PI-GNE functionalized SWNTs (SWNTs/PI-GNE/CE) were also prepared by a similar method.

Example 21

Synthesis of Polyimide-graft-glyceryl 4-nonylphenyl Ether (PI-GNE) (Step 3b of FIG. 2)

Similar to the synthesis of PI-BDA as discussed in Example 3, the synthesis of PI-GNE was realized via reaction between the pedant hydroxyl groups on PI and epoxy groups on GNE with DMAP as catalyst. Step 3b of FIG. 2 shows the synthesis route of PI-GNE.

Figure 22:
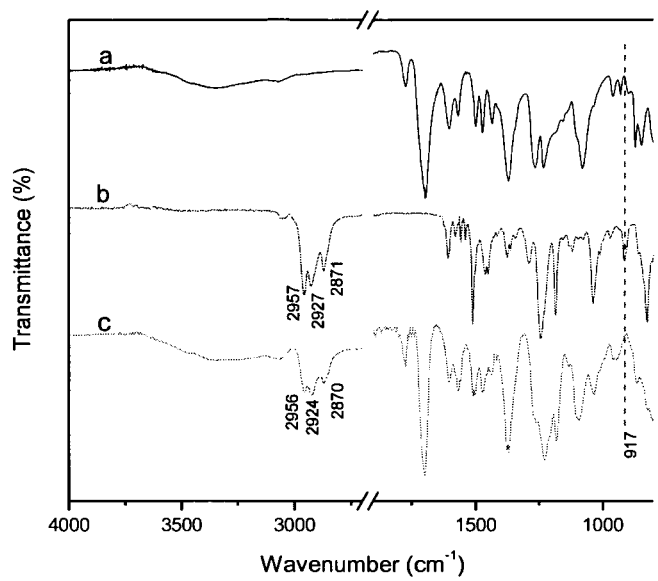
FIG. 22 is a graph showing FTIR-ATR spectra of (a) PI, (b) GNE, and (c) PI-GNE.

FIG. 22 shows the FTIR-ATR spectra of PI, GNE, and PI-GNE. The spectrum of GNE shows characteristic peaks of epoxy group at 917 cm-1. The peaks at 2871, 2927, and 2957 $cm^{-1}$ are identified as the C—H stretching mode of methyl and methylene groups. The spectrum of PI-GNE shows the characteristic peaks of its precursor PI, i.e. at 1772, 1699, and 1373 $cm^{-1}$, corresponding to the imide group, and at 1604, 1568, 1502, 1475 $cm^{-1}$, corresponding to the aromatic C=C bands. After grafting the GNE side chain, new peaks at 2956, 2924, and 2870 $cm^{-1}$ appear in the spectrum, which can be clearly assigned to the C—H stretches of —$CH_2$ and —$CH_3$ groups in the GNE side chain. A broad band at about 3700-3100 cm-1 in the spectrum of PI-GNE is attributed to the —OH group generated in the ring-opening reaction of epoxy groups. No characteristic peak of epoxy group (~917 $cm^{-1}$) appears in the spectrum. All these confirm successful grafting of GNE onto the PI backbone via reaction between —OH groups on PI and epoxy groups on GNE.

Example 22

Dispersion of SWNTs in DMF

Figure 23:
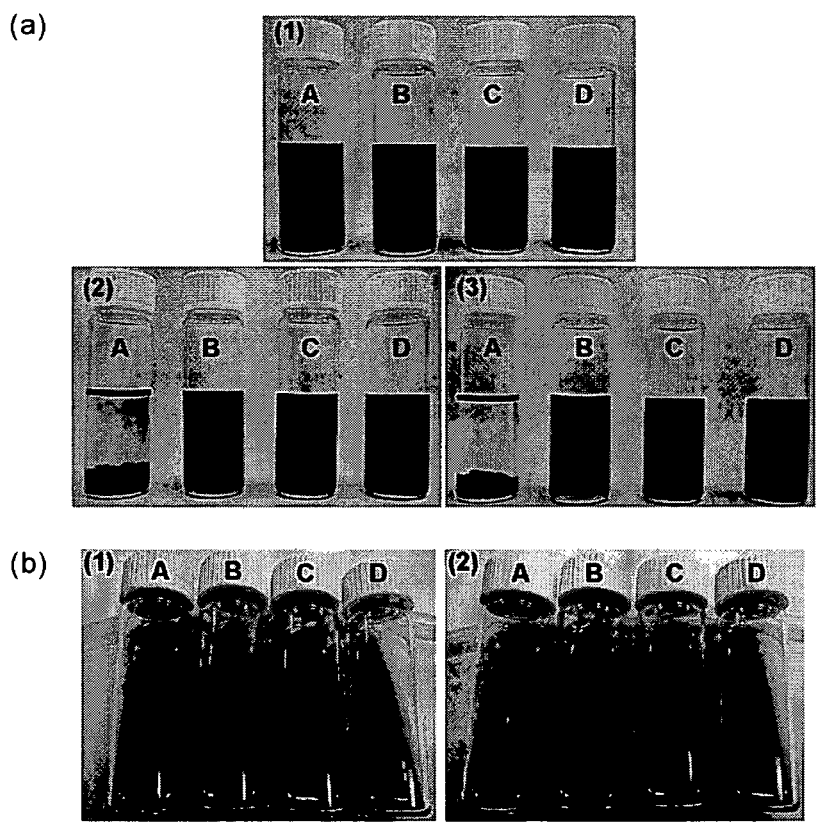
FIG. 23 are photographs showing (a) Direct observation of (A) SWNTs, (B) SWNTs/PI, (C) SWNTs/PI-GNE, and (D) SWNTs/PI-BDA in DMF for different times after sonication: (1) 0 min, (2) 10 days, and (3) 2 months; (b) Direct observation of (A) SWNTs, (B) SWNTs/PI, (C) SWNTs/PI-GNE, and (D) SWNTs/PI-BDA (1) before and (2) after adding prepolymerized CE.

FIG. 23a compares the dispersion stability of SWNTs, SWNTs/PI, SWNTs/PI-GNE, and SWNTs/PI-BDA in DMF, at different standing times after sonication. Pristine SWNTs aggregated and settled within 10 days (FIG. 23a-2, vial A). SWNTs/PI partially aggregated but remained in suspension at two months (FIG. 23a-3, vial B). SWNTs modified with PI-GNE and PI-BDA were still well-dispersed and suspended at two months (FIG. 23a-3, vials C and D). These results indicate that the side chain grafted on the backbone of the PI, which imparts strongly repulsive forces to SWNTs/PI-BDA and -GNE via steric hindrance, is very important to the long-term dispersion stability of the functionalized SWNTs in DMF. However, there was no obvious difference between the SWNT/PI-GNE and SWNT/PI-BDA suspensions.

The efficacy of PI, PI-GNE and PI-BDA at dispersing SWNTs was quantitatively compared using UV-vis absorbance measurement and Beer-Lambert law, which is defined as $A = \in lc$, where A is the absorbance at a fixed wavelength, $\in$ is extinction coefficient, l is the light path length (1 cm for our cell), and c is the nanotube concentration. The extinction coefficient ($\in$), which is strongly depended on nanotube type, solvent type and wavelength of the measured absorbance, has been determined to be about 37.60 mL $mg^{-1}$ $cm^{-1}$ at 500 nm for SWNTs in DMF.

Figure 24:
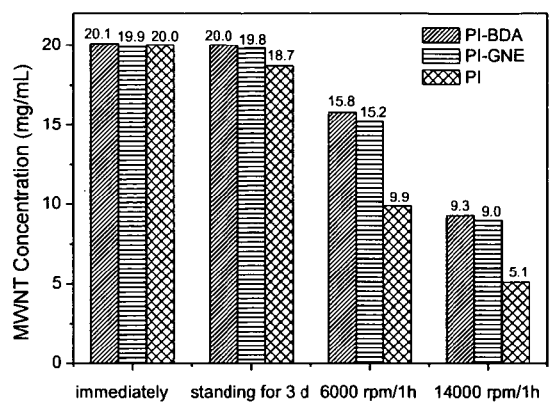
FIG. 24 is a graph showing SWNT concentrations of SWNT/PI, SWNT/PI-GNE and SWNT/PI-BDA dispersions (mass ratio of SWNTs to polymer is 1:1) in different conditions: immediately after sonication, after standing 3 days, centrifugation at 6000 rpm for 1 h, and centrifugation at 14 000 rpm for 1 hour.

FIG. 24 shows the nanotube concentrations of SWNT/PI, SWNT/PI-GNE, and SWNT/PI-BDA dispersions (mass ratio of SWNTs to polymer was fixed at 1:1) in indifferent conditions, determined by measuring absorbance at 500 nm and Beer-Lambert law. Immediately after sonication, all of the three dispersions seem homogeneous, and have an initial suspended SWNT concentration of about 20 mg/L. After standing for 3 days, centrifugation at 6000 rpm for 1 h, and centrifugation at 14000 rpm for 1 h, the SWNT concentrations of SWNT/PI-GNE (19.8, 15.2 and 9.0 mg/L, respectively) and SWNT/PI-BDA (20, 15.8 and 9.3 mg/L, respectively) are quite similar, which however are much higher than that of SWNT/PI dispersion (18.7, 9.9 and 5.1 mg/L, respectively). This observation is consistent with the results of direct observation.

In order to investigate the dispersion of SWNTs, SWNTs/PI, SWNTs/PI-GNE, and SWNTs/PI-BDA in CE matrix, 100 mg prepolymerized CE (180° C. for 1 h) was added to 2 mL of SWNT/DMF solutions (concentration fixed at 0.2 mg/mL, with surfactant/SWNT mass ratio of 1:1). FIG. 23b(1) shows sonicated SWNT/DMF solutions without added CE; all solutions appear homogeneous except for the SWNT/DMF solution, in which there are obvious aggregates, indicating poor dispersibility of pristine SWNTs in DMF. FIG. 23b(2) shows the solutions with added prepolymerized CE after 15 minutes. The pristine SWNT solution is unchanged, but the SWNT/PI solution shows coagulation or agglomeration of the suspended nanotubes. The PI-GNE and PI-BDA functionalized nanotube solutions show no change in this image. In data not shown, after about 6 hours fine aggregates appeared in the SWNT/PI-GNE/CE solution, while the PI-BDA functionalized nanotubes showed no visible evidence of gross aggregation after 24 h. The dramatic variation in behavior is further evidence that the precise nature of the side chain is important in the design of polymer surfactants to disperse carbon nanotubes in a polymer (in this case, CE) solution. The structure of the PI-BDA side chain is more similar to CE than is the PI-GNE side chain. This higher compatibility between the BDA side chain and CE matrix results in higher efficiency of PI-BDA than PI-GNE in dispersing nanotubes in CE solution. For the PI-BDA surfactant, it is postulated that there is higher efficiency in dispersing CNTs in CE matrix for longer side chains grafted onto the PI backbone.

Example 23

Dispersion, Morphology and Interfacial Bonding of SWNTs in Composite Films

Figure 25:
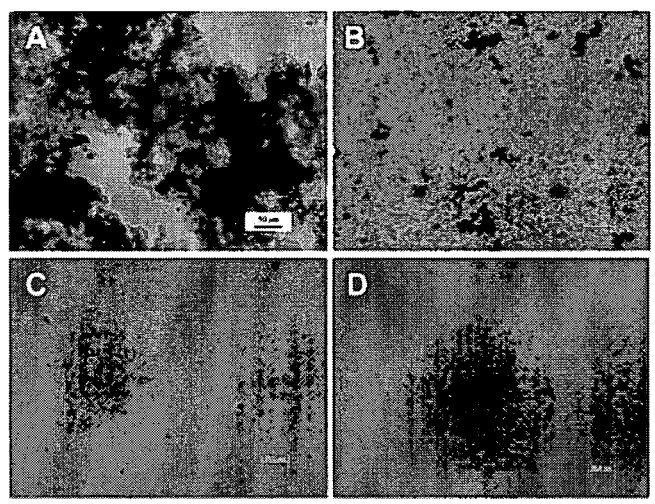
FIG. 25 are optical micrographs of (A) SWNT/CE, (B) SWNT/PI/CE, (C) SWNT/PI-GNE/CE, and (D) SWNT/PI-BDA/CE composites at SWNT loading of 1 wt %. Scale bar (50 μm) for all images.

Optical micrographs can show the microscale state of the dispersion of the carbon nanotube in the CE matrix. The representative optical micrograph of SWNT/CE composite (FIG. 25A) shows many aggregated clusters of SWNTs, suggesting nonuniform dispersion of SWNTs. The nanotube dispersion was improved with the addition of PI functionalized SWNTs, though some SWNT aggregates with sizes as large as 10 μm can be clearly seen (FIG. 25B). In SWNT/PI-GNE/CE nanocomposite (FIG. 25C), dense aggregates are still apparent but the aggregate size is much smaller than that in the SWNT/PI/CE composite, indicating much improved SWNT dispersion. By comparison, SWNT/PI-BDA/CE composite show homogeneous dispersion of SWNTs throughout the matrix, and no obvious SWNT aggregates were observed (FIG. 25D).

From the results obtained, it is noted that SWNTs/PI-GNE and SWNTs/PI-BDA have similar dispersion in DMF, but the dispersion of SWNTs/PI-BDA was much better than that of SWNTs/PI-GNE in CE matrix. It is believed that the differences in ability between PI-BDA and PI-GNE to disperse SWNTs in CE matrix can be attributed to the different structures of their side chains. It is believed that, as the structure of PI-BDA side chain is more similar to that of CE monomer than is that of PI-GNE, this compatibility between the side chain of PI-BDA and CE matrix reduces the likelihood of SWNT aggregation during film preparation. Since reduced aggregation and improved dispersion can correlate with reinforcement efficacy of the filler, side chain compatibility with the matrix is an important consideration in the design of effective SWNT-functionalizing materials.

Figure 26:
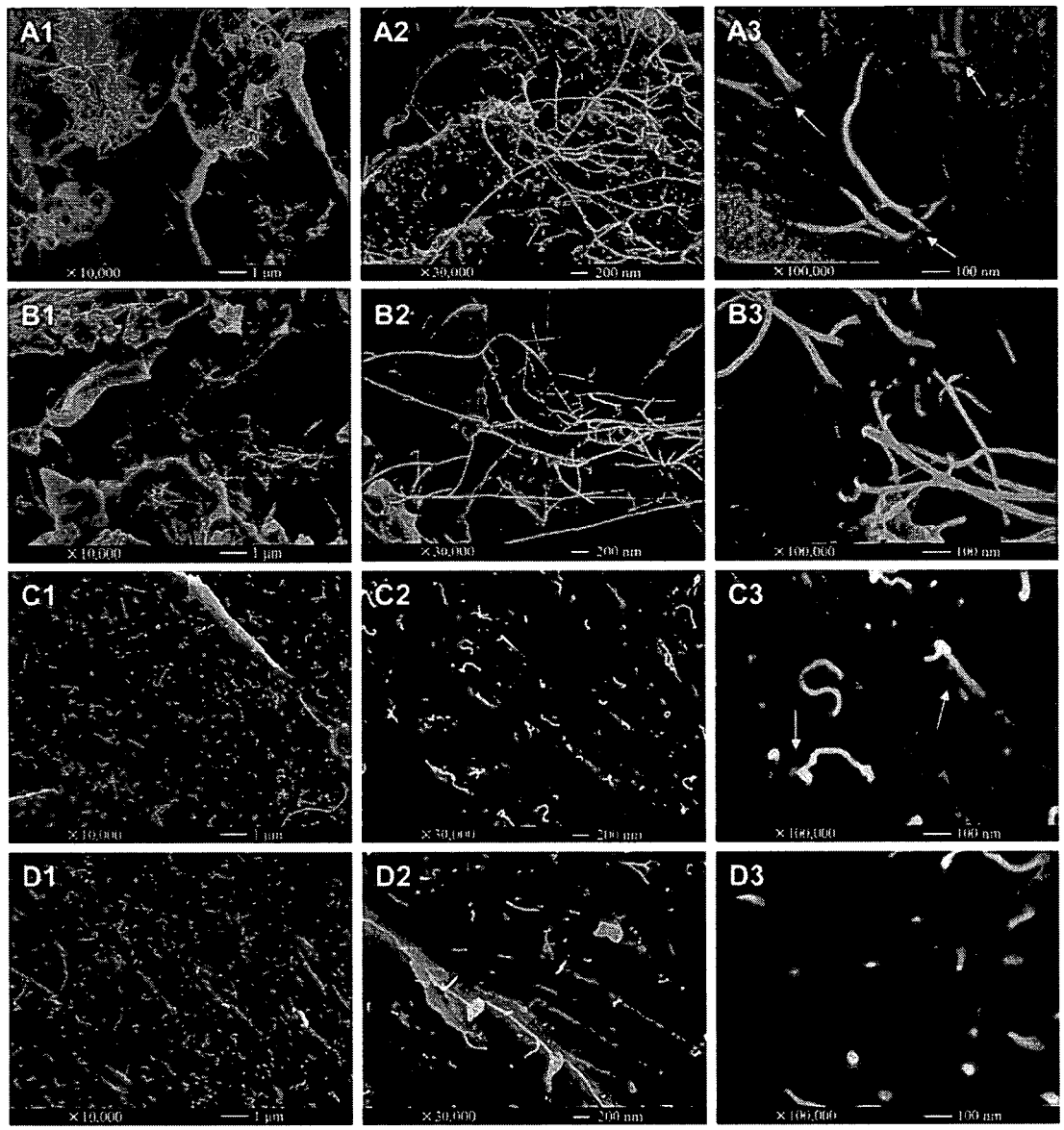
FIG. 26 are FE-SEM images of fracture surfaces of (A1-A3) SWNT/CE, (B2-B3) SWNT/PI/CE, (C1-C3) SWNT/PI-GNE/CE, and (D1-D3) SWNT/PI-BDA/CE composites. The SWNT loading in these composites is 1 wt %.

The fracture surfaces of composite films after tensile testing were characterized with FE-SEM. In SWNT(1 wt %)/CE nanocomposites, SWNTs are observed as agglomerated ropes divided by regions containing no SWNTs (FIG. 26A1). Many SWNTs have been pulled out from the matrix (FIG. 26A2), leaving holes between nanotubes and CE matrix (indicated by arrows in FIG. 26A3), which indicates weak interfacial bonding between SWNTs and CE matrix. As shown in FIG. 26B1-B3, PI functionalized SWNTs are also dispersed as aggregates in the CE matrix, and many of the tubes are found to be pulled out. However, the aggregate size is much smaller and the nanotube-matrix adhesion seems stronger when compared with SWNTs/CE. The fracture surface of SWNT(1 wt %)/PI-GNE/CE composite films (FIG. 26C1-C3) show much better dispersion of SWNTs in CE matrix compared to SWNTs/CE and SWNTs/PI/CE. But there is still some degree of SWNTs sliding and pulling out of the surface, although other SWNTs are found to have broken at the surface. FIG. 26C3 clearly shows some big SWNT bundles pulled out (indicated by arrows). In SWNT(1 wt %)/PI-BDA/CE composite, SWNTs are homogeneously dispersed on the fracture surface (FIG. 26D1) and most of them are broken or only slightly pulled out from the surface (FIGS. 26D2 and D3). FIG. 26D3 shows the diffuse character of the edges of the functionalized SWNTs, and some nanotubes with tip smaller than the end embedded in matrix. These suggest that the SWNTs are covered with a polymer shell and tightly embedded in the matrix, which would predict effective load transfer from matrix to SWNTs. All these fracture surfaces characteristics are in accordance with the mechanical properties of the corresponding composites, discussed below.

Figure 27:
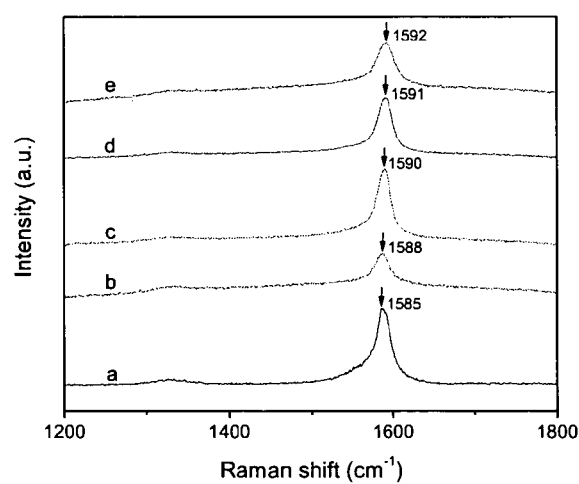
FIG. 27 is a graph showing Raman spectra of (a) neat SWNTs, (b) SWNT/CE, (c) SWNT/PI/CE, (d) SWNTs/PI-GNE/CE, and (e) SWNTs/PI-BDA/CE composites. The SWNT loading in composites is 5 wt %.

Raman spectroscopy was used to study the interactions between carbon nanotubes and molecules based on the changes in peak position. FIG. 27 shows the Raman spectra of SWNTs, and SWNT/PI, SWNT/CE, SWNT/PI-GNE/CE and SWNT/PI-BDA/CE composite films. The peaks at around 1330 and 1590 cm$^{-1}$ correspond to the defects- and disorder-induced modes (D band) and the in-plane $E_{2g}$ zone-center mode (G band), respectively. As compared to pristine SWNTs, no significant increase in the G/D (graphite/defect) ratio was observed in the spectra of SWNT/PI, SWNTs/PI-GNE and SWNTs/PI-BDA, indicating that few defects were introduced into SWNTs and the nanotube length was well preserved. This is expected since the dispersants interact non-covalently with the SWNTs and the sonication applied for composite preparation is not very severe. The intact SWNT surfaces and long length contributes to the mechanical properties of the nanotube reinforced composites.

Comparing the G band of SWNT/CE (1588 cm$^{-1}$), SWNT/PI/CE (1590 cm$^{-1}$), SWNT/PI-GNE/CE (1591 cm$^{-1}$), and SWNT/PI-BDA/CE (1592 cm$^{-1}$) to the neat SWNTs (1585 cm$^{-1}$), upshifts of 3, 5, 6 and 7 cm$^{-1}$, respectively, were observed. The 3 cm$^{-1}$ upshift of G band in SWNT/CE composites is due to the interaction between SWNTs and CE matrix which contains a large amount of triazine and benzene rings. The 2-4 cm$^{-1}$ higher upshifts in the SWNT/PI/CE, SWNT/PI-BDA/CE and SWNT/PI-GNE/CE composites compared to SWNT/CE suggest that the electronic environment of the SWNT surfaces also has changed by the polymeric dispersants, which is believed to be due to the π-π interaction between the SWNTs and the polyimide backbone of the dispersants. PI-BDA functionalized SWNTs show more upshifts than SWNTs/PI and SWNTs/PI-GNE, which may be attributed to their better dispersion resulting in more chance to interact with CE matrix.

It is believed that the stronger nanotube-matrix interfacial bonding in SWNT/PI/CE, SWNT/PI-GNE/CE and SWNT/PI-BDA/CE composites than in SWNT/CE composite is due to polymeric dispersant adsorbed on nanotube surface, which not only improve the compatibility between nanotube and matrix but also react with CE matrix. The covalent reaction is realized via the reaction between —OH group on dispersants and —OCN group on CE matrix. The stronger interfacial bonding in SWNT/PI-BDA/CE than in SWNT/PI/CE and SWNT/PI-GNE/CE can be attributed to the better dispersion of SWNTs/PI-BDA, which enables more nanotube surfaces to interact with the surrounding CE matrix.

Example 24

Mechanical Properties of Composite Films

Figure 29:
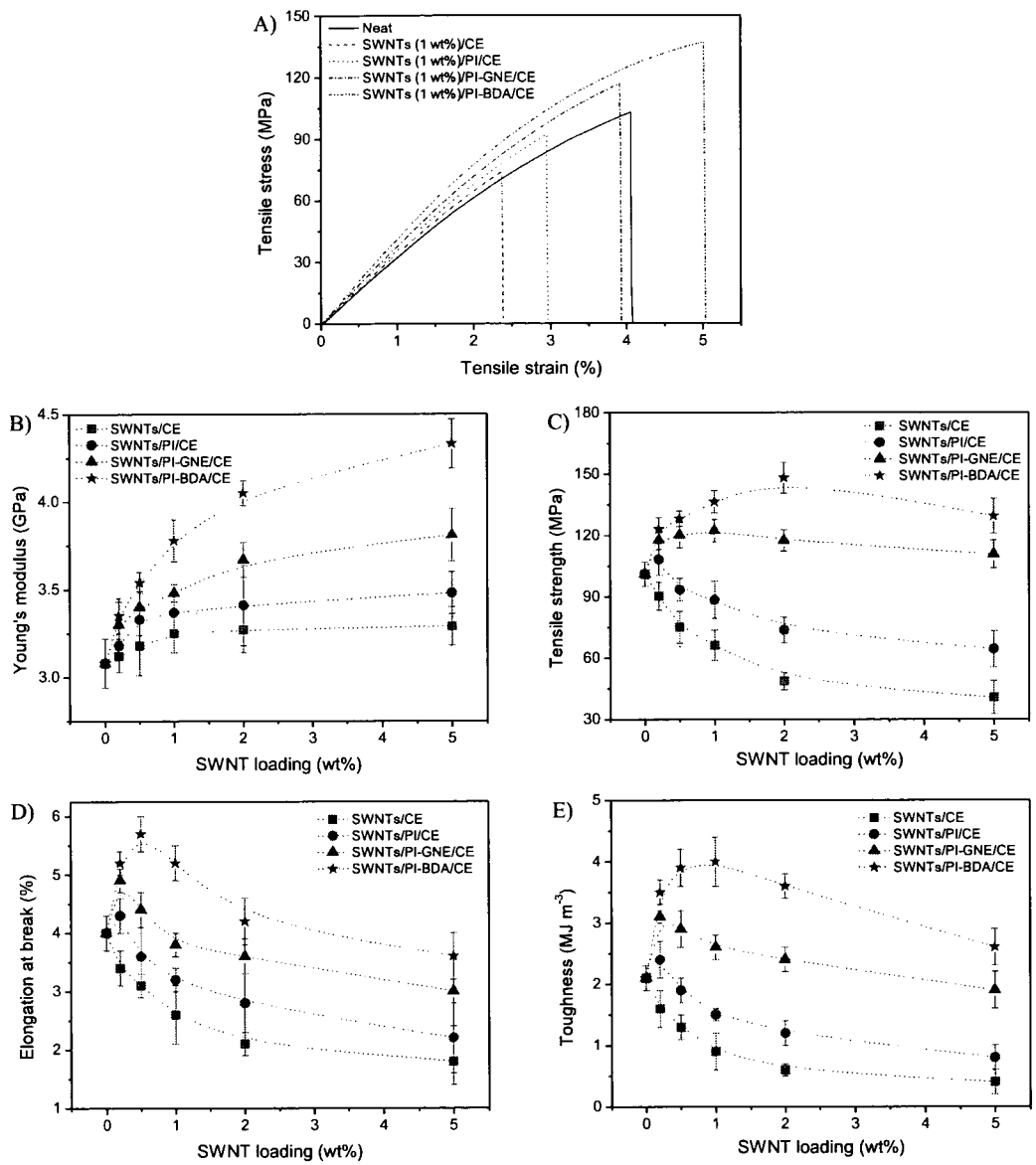
FIG. 29 are graphs showing (A) Representative stress-strain curves of neat CE, SWNT (1 wt %)/CE, SWNT (1 wt %)/PI/CE, SWNT(1 wt %)/PI-GNE/CE, and SWNT(1 wt %)/PI-BDA/CE composites. Effect of SWNT content on (B) Young's modulus, (C) tensile strength, (D) elongation at break, and (E) toughness of SWNT/CE, SWNT/PI/CE, SWNTs/PI-GNE/CE, and SWNTs/PI-BDA/CE composites.

The tensile properties, including Young's modulus (E), tensile strength ($\sigma$), elongation at break ($\in$) and toughness (T) of neat CE, SWNT/CE, SWNT/PI/CE, SWNT/PI-GNE/CE and SWNT/PI-BDA/CE composites with different SWNT loadings are summarized in the table in FIG. 28 and FIG. 29. FIG. 29A shows the representative tensile stress versus strain curves of neat CE and composites with SWNT loading of 1 wt %. The Young's modulus, tensile strength, elongation at break and toughness of the neat CE are 3.08±0.14 GPa, 101.1±6.0 MPa 4.0±0.3% and 2.1±0.2 MJ m$^{-3}$, respectively.

FIG. 29B shows that for all the four kinds of nanotubes, the Young's modulus (E) increases as the nanotube loading increase from 0 to 5 wt %, but the percent increases differ. Compared with neat CE (E=3.08±0.14 GPa), the highest increase in E is about 7% (to 3.29±0.11 GPa), 13% (to 3.48±0.18 GPa), 24% (to 3.81±0.15 GPa) and 41% (to 4.33±0.14 GPa), respectively, for SWNT/CE, SWNT/PI/CE, SWNT/PI-GNE/CE and SWNT/PI-BDA/CE composites with 5 wt % of nanotubes. As shown in FIG. 29C-E, SWNTs without dispersant lead to continuous decrease in $\sigma$, $\in$ and T as the nanotube loading increase from 0 to 5 wt %. For SWNT/PI/CE composite, composite with 0.2 wt % of SWNTs/PI shows the highest values of $\sigma$, $\in$ and T, i.e. $\sigma$=108.3±7.7 MPa, $\in$=4.3±0.3% and T=2.4±0.3 MJ m$^{-3}$, corresponding to 7%, 8% and 14% improvements over the neat CE, respectively. Further increase of nanotube loading impairs tensile properties.

With the addition of SWNTs/PI-GNE, the composites exhibit an increase in a at low CNT loadings and a decrease at high CNT loadings. The SWNT(1 wt %)/PI-BDA/CE composite has the highest strength of 122.3±5.6 MPa, corresponding to a 21% increase over the neat CE. The $\in$ and T increase initially at SWNT loading of 0.2 wt % but decrease continuously at higher SWNT loadings. The highest values of c and T are 4.9±0.2% and 3.1±0.1 MJ m-3, respectively, showing 23% and 48% increases over the neat CE. The SWNT/PI-DBA/CE composite films exhibit very similar increasing tendency in $\sigma$, $\in$ and T as SWNT/PI-GNE/CE composite, but SWNTs/PI-BDA is more effective in mechanical reinforcement. The increase of a continues up to 2 wt % of nanotube loading, the highest tensile strength at 2 wt % of nanotube is 148.1±7.6 MPa, which is a 46% increase over neat CE. The highest increase in $\in$ is 93% (from 4.0±0.3 to 5.7±0.3%) achieved at SWNT loading of 0.5 wt % while the highest increase in T is 90% (from 2.1±0.2 to 4.0±0.4 MJ m$^{-3}$) observed at SWNT loading of 1 wt %. The mechanical properties of SWNT/PI-BDA/CE composite at nanotube loading of 2 wt % is relatively very high as compared with other reported CNT reinforced thermosetting composites.

The poor reinforcement effect of SWNTs and SWNTs/PI can be attributed to the relatively larger size of the SWNT aggregates and the weak interfacial adhesion between nanotube and CE matrix, which have been discussed in the previous examples. The use of PI-GNE or PI-BDA functionalized SWNTs effectively enhances the mechanical properties of CE matrix. The superior reinforcement of CE matrix with SWNTs/PI-BDA as compared to that of SWNTs/PI-GNE is attributable to their better dispersion in CE matrix and stronger SWNT-CE interfacial interaction (and, consequently, more effective load transfer), as demonstrated by FE-SEM images of the fracture surface of composites (FIG. 26) and Raman spectra (FIG. 27). Unlike conventional fiber-reinforced composites, in which $\in$ usually drops dramatically when short fibers are added as filler, the SWNT/PI/CE, SWNT/PI-GNE/CE and SWNT/PI-BDA/CE composites show increase of $\in$ at relatively low CNT loadings. This is possibly due to the particular high aspect ratio and highly flexible elastic behavior of SWNTs during loading.

Further, the curved SWNTs embedded in matrix can be continuously stretched. The increase of $\in$ is very usefully for improving the fracture toughness of composite. Both SWNT/PI-GNE/CE and SWNT/PI-BDA/CE composites show significantly increased toughness as compared with neat CE. This can be attributed to the homogeneous SWNT dispersion, which provides more nanotube surfaces available for interaction with CE matrix, and the strong nanotube-matrix interfacial bonding, both of which would resist the propagation of cracks during deformation, leading to increased fracture toughness. Increased toughness for CE composite is very useful since the application of CE is sometimes limited by its brittle nature.

Decrease of $\sigma$ at high nanotube loadings is observed in the composites obtained through a method of the present invention, which has also been reported for other nanotube/polymer composites. One of the reasons for this could be the poor wetting of CNTs at high nanotube loading, which leads to weak interfacial bonding. Another possible reason could be that CNTs may inadvertently affect the curing of thermosets and alter the network of cured matrix, especially near the interface between CNTs and matrix.

Example 25

Comparison of Experimental Results with Theoretical Values

A comparison was made for the experimental results with the values predicted from theoretical models. Young's modulus data can be analyzed using the Halpin-Tsai model. For randomly distributed SWNTs in a polymer matrix, the modified Halpin-Tsai equation is written as:

$$E_C = E_P \left[ \frac{3}{8} \frac{1 + 2(l_f/d_f)\eta_L V_f}{1 - \eta_L V_f} + \frac{5}{8} \frac{1 + 2\eta_T V_f}{1 - \eta_T V_f} \right]. \quad (1)$$

$$\eta_L = \frac{\left(\frac{E_f}{E_P}\right) - 1}{\left(\frac{E_f}{E_P}\right) + 2(l_f/d_f)} \quad (2)$$

$$\eta_T = \frac{\left(\frac{E_f}{E_P}\right) - 1}{\left(\frac{E_f}{E_P}\right) + 2} \quad (3)$$

where $E_C$, $E_f$, and $E_P$ are the tensile moduli of the composite, nanotube, and polymer matrix, respectively, $l_f$ is average length of SWNTs, $d_f$ is average diameter of SWNTs, and $V_f$ is SWNT volume fraction. The SWNT mass fractions can be converted into volume fraction using the relation $$\frac{1}{V_f} = \left(\frac{\rho_f}{\rho_P}\right)\left(\frac{1-m_f}{m_f}\right) + 1 \qquad (4)$$

where $V_f$ is the SWNT volume fraction, $m_f$ is the SWNT mass fraction in polymer matrix and $\rho_f$ and $\rho_P$ are the densities of CNTs and polymer matrix, respectively. Based on the numerical values $\rho_f=1.5$ g cm$^{-3}$, $\rho_P=1.2$ g cm$^{-3}$, $l_f=5$, $d_f=5$ nm, $E_P=3.08$ GPa and $E_f=640$ GPa,[27] the predicted moduli are 3.44 GPa, 3.97 GPa, 4.86 GPa, 6.66 GPa, and 12.10 GPa for composites with SWNT loadings of 0.2, 0.5, 1, 2, and 5 wt %, respectively. At low SWNT loading (i.e. 0.2%), our experimental results (3.30 and 3.35 GPa for SWNT(0.2 wt %)/PI-GNE/CE and SWNT(0.2 wt %)/PI-BDA/CE composites, respectively) are very close to the predicted modulus (3.44 GPa), suggesting excellent SWNTs dispersion in the case of low nanotube loading. As the SWNT loading increases, the experimental modulus data diverge from the predicted values.

The tensile strength of CE composites reinforced with SWNTs can be predicted by a standard equation $\sigma_C=\sigma_f V_f + \sigma_m(1-V_f)$, where $\sigma_C$, $\sigma_f$, $\sigma_P$ are the composite, the nanotube, and the polymer matrix strengths, respectively. $V_f$ is the volume fraction of SWNTs. Using this equation with $\sigma_f=30.0$ GPa, $\sigma_m=101.1$ MPa, the tensile strength of CE composites reinforced with SWNTs is calculated to be 148.9 MPa, 220.8 MPa, 340.8 MPa, 581.4 MPa, and 1309.1 MPa for CE composites with SWNT loadings of 0.2, 0.5, 1, 2, and 5 wt %, respectively. The experimental results obtained are lower than the predicted values, and the difference becomes larger as the SWNT loading increases.

Possible reasons for the lower experimental results than theoretical values may include the inevitable nanotube bundling, relatively weak SWNT-CE interfacial bonding for non-covalently functionalized SWNTs, SWNT-induced impairement of the network of cured CE, some void defects in composites, and so on. It is believed that better mechanical improvements can be achieved by optimizing these factors.

What is claimed is:

1. A method of dispersing carbon nanotubes in a thermosetting resin, comprising:
   (a) contacting the carbon nanotubes with a dispersant in a solvent to form a dispersion mixture, wherein the dispersant is a graft polymer comprising a polymeric backbone and at least one side chain grafted to the polymeric backbone, wherein the polymeric backbone is a polyimide backbone having at least one aromatic ring or a polybenzimidazole backbone having at least one aromatic ring, and wherein the at least one side chain comprises a side chain having a phenolic structure and at least one hydroxyl group, a side chain having a bisphenolic structure and at least one hydroxyl group, or a combination thereof; and
   (b) adding the thermosetting resin to the dispersion mixture to form a resin blend, wherein the at least one hydroxyl group present in the at least one side chain of the dispersant covalently bonds to the thermosetting resin.

2. The method of claim 1, wherein the polymeric backbone of the dispersant binds to the carbon nanotubes.

3. The method of claim 1, wherein the grafted side chain prevents aggregation of the carbon nanotubes.

4. The method of claim 1, wherein the method further comprises homogenizing the dispersion mixture to form a homogeneous dispersion solution prior to step (b).

5. The method of claim 1, wherein the method further comprises homogenizing the resin blend.

6. The method of claim 1, wherein the thermosetting resin is selected from the group consisting of a cyanate ester, epoxy, vinyl ester, polyimide, bismaleimide, and a mixture thereof.

7. The method of claim 1, wherein the at least one side chain is provided by grafting a glycidyl ether compound to the polymeric backbone, wherein the glycidyl ether compound is a mono-acrylate of a bisphenol diglycidyl ether or 4-nonylphenol glycidyl ether.

8. The method of claim 1, wherein the solvent is selected from the group consisting of N,N'-dimethylformamide, N-methyl-2-pyrrolidone, and 1,2-dichloroethane.

9. A composition comprising:
   carbon nanotubes;
   a thermosetting resin; and
   a dispersant for dispersing the carbon nanotubes in the thermosetting resin, wherein the dispersant is a graft polymer comprising a polymeric backbone and at least one side chain grafted to the polymeric backbone, wherein the polymeric backbone is a polyimide backbone having at least one aromatic ring or a polybenzimidazole backbone having at least one aromatic ring, and wherein the at least one side chain comprises a side chain having a phenolic structure and at least one hydroxyl group, a side chain having a bisphenolic structure and at least one hydroxyl group, or a combination thereof, and wherein the at least one hydroxyl group present in the at least one side chain of the dispersant covalently bonds to the thermosetting resin.

10. The composition of claim 9, wherein the polymeric backbone of the dispersant binds to the carbon nanotubes.

11. The composition of claim 9, wherein the grafted side chain prevents aggregation of the carbon nanotubes.

12. The composition of claim 9, wherein the thermosetting resin is selected from the group consisting of a cyanate ester, epoxy, vinyl ester, polyimide, bismaleimide, and a mixture thereof.

13. The composition of claim 9, wherein the at least one side chain is provided by grafting a glycidyl ether compound to the polymeric backbone, wherein the glycidyl ether compound is a mono-acrylate of a bisphenol diglycidyl ether or 4-nonylphenol glycidyl ether.

14. A method of preparing a composite fiber having carbon nanotubes dispersed therein, comprising:
   (a) contacting the carbon nanotubes with a dispersant in a solvent to form a dispersion mixture, wherein the dispersant is a graft polymer comprising a polymeric backbone and at least one side chain grafted to the polymeric backbone, wherein the polymeric backbone is a polyimide backbone having at least one aromatic ring or a polybenzimidazole backbone having at least one aromatic ring, and the at least one side chain comprises a side chain having a phenolic structure and at least one hydroxyl group, a side chain having a bisphenolic structure and at least one hydroxyl group, or a combination thereof;
   (b) adding a thermosetting resin to the dispersion mixture to form a resin blend, wherein the at least one side chain of the dispersant covalently bonds to the thermosetting resin;

(c) evaporating the solvent in the resin blend to obtain a composite material; and
(d) forming the composite fiber from the composite material.

15. The method of claim 14, wherein the method further comprises the step of homogenizing the dispersion mixture to form a homogeneous dispersion solution prior to step (b).

16. The method of claim 14, wherein the method further comprises the step of homogenizing the resin blend prior to step (c).

17. The method of claim 14, wherein the thermosetting resin is selected from the group consisting of a cyanate ester, epoxy, vinyl ester, polyimide, bismaleimide, and a mixture thereof.

18. The method of claim 14, wherein the at least one side chain is provided by grafting a glycidyl ether compound to the polymeric backbone, wherein the glycidyl ether compound is a mono-acrylate of a bisphenol diglycidyl ether or 4-nonylphenol glycidyl ether.

19. The method of claim 14, wherein the solvent is selected from the group consisting of N,N'-dimethylformamide, N-methyl-2-pyrrolidone, and 1,2-dichloroethane.

* * * * *